(12) United States Patent
Teeuwen et al.

(10) Patent No.: US 7,079,269 B2
(45) Date of Patent: Jul. 18, 2006

(54) INTERACTIVE PRINTING WITH A PLURALITY OF PRINTER DEVICES

(75) Inventors: Peter Johannes Hendrikus Maria Teeuwen, Maasbree (NL); Monica Maria Wilhelmina Mathea Roosen, Venlo (NL); Robertus Cornelis Willibrordus Theodorus Maria van den Tillaart, Gemert (NL); Duncan Antoon Helena Stiphout, Eindhoven (NL); Gerardus Johannes Rozing, Horst (NL)

(73) Assignee: Océ-Technologies B.V., Venlo (NL)

( * ) Notice: Subject to any disclaimer, the term of this patent is extended or adjusted under 35 U.S.C. 154(b) by 831 days.

(21) Appl. No.: 09/729,352

(22) Filed: Dec. 5, 2000

(65) Prior Publication Data

US 2001/0038462 A1 Nov. 8, 2001

Related U.S. Application Data

(63) Continuation-in-part of application No. 09/272,556, filed on Mar. 19, 1999, now Pat. No. 6,181,893.

(30) Foreign Application Priority Data

Mar. 19, 1998 (NL) .................................. 1008642

(51) Int. Cl.
*B41B 27/26* (2006.01)
*B41B 27/18* (2006.01)
*G06F 3/12* (2006.01)

(52) U.S. Cl. ..................... 358/1.15; 358/403
(58) Field of Classification Search ............... 358/1.15, 358/1.16, 403; 707/500; 399/80, 81, 82, 399/83
See application file for complete search history.

(56) References Cited

U.S. PATENT DOCUMENTS

| 5,068,888 | A | | 11/1991 | Scherk et al. |
| 5,689,642 | A | * | 11/1997 | Harkins et al. ............. 709/207 |
| 5,819,015 | A | * | 10/1998 | Martin et al. ............... 358/1.15 |
| 6,130,757 | A | * | 10/2000 | Yoshida et al. ............. 358/1.15 |
| 6,348,972 | B1 | * | 2/2002 | Taniguchi et al. ......... 358/1.15 |
| 6,587,861 | B1 | * | 7/2003 | Wakai et al. ................ 715/500 |
| 6,762,853 | B1 | * | 7/2004 | Takagi et al. .............. 358/1.15 |
| 6,859,832 | B1 | * | 2/2005 | Gecht et al. ................ 709/224 |

FOREIGN PATENT DOCUMENTS

EP 0689157 A2 12/1994

(Continued)

*Primary Examiner*—King Y. Poon
*Assistant Examiner*—Lucas Divine
(74) *Attorney, Agent, or Firm*—Birch, Stewart, Kolasch & Birch, LLP

(57) ABSTRACT

A network system for printing digital print files, including personal workstations of users and a plurality of printers. The system further includes a print service and a print file storage service, that may be implemented in several ways. A user may submit a print file without specifying a particular printer on which the file must be printed. Then, he can walk up to any of the printers and start the print process for his print file there. In operation, the print service receives the print file, extracts metadata specifying job information from the file, and stores the file in the print file storage service. The metadata of the file are transmitted to the printers, which include the metadata in local print selection mechanisms resident in said printers. The user may select his print file at the operating panel of any one of the printers and start the printing process. In response, that printer fetches the print image data of the selected file from the print file storage service and prints the file.

59 Claims, 28 Drawing Sheets

FOREIGN PATENT DOCUMENTS

EP 0756414 A2 1/1997
EP 0944239 A1 9/1999

* cited by examiner

13-10

User presses storage key
UI asks JM for list of user names

13-20 — JM passes list to UI

13-30

UI displays list and asks:
"printing or scanning?"
user selects his name
user selects "printer"*
user makes settings
user presses storage key
UI passes selections to JM

* or "scanner"

13-40 — JM generates profile name with extention
" pro" and passes to UI

13-50

UI displays profile name

13-60 — JM enters profile under the name of user and sends profile to JS

13-70 — JS stores profile on disk end

FIG. 13

INTERACTIVE PRINTING WITH A PLURALITY OF PRINTER DEVICES

This application is a continuation-in-part of application Ser. No. 09/272,556 filed on Mar. 19, 1999, now U.S. Pat. No. 6,181,893, the entire contents of which are hereby incorporated by reference.

BACKGROUND OF THE INVENTION

1. Technical Field of the Invention

The invention relates to printing of digital image files in a network system. In such a system, personal workstations of users and printers are interconnected for printing digital print files that have been made in a workstation. Digital image reproduction apparatuses can advantageously be used as printers. Such a digital image apparatus includes a scanner unit, a printer unit, a memory, and an operator control unit integrated in the apparatus, the operator control unit being provided with an input device and a display that permit a user to give operator control commands to the apparatus. Further, such a digital reproduction apparatus includes a network connection unit for coupling to a network for the purpose of communication with a digital external environment having at least a number of workstations of users, and a management unit connected to the scanner unit, printer unit, memory and network connection unit, and, via the network connection unit, to the workstations.

The invention also relates to a system in which a plurality of such digital reproduction apparatuses is connected to the network.

2. Description of Related Art

Reproduction apparatuses of the kind described above are generally known. Such apparatuses can be used for copying documents and for printing digital image data files made in a workstation.

The term "workstation of a user" means a workstation running a program personalized for that user.

Applicants' U.S. Pat. No. 5,825,988 discloses a printing apparatus which never directly prints a print file received from a digital environment, but stores it internally under the owner's name and does not print it until a command for this purpose is given from the apparatus operator control panel, this command identifying the file.

In this way, data traffic between the digital environment and the apparatus is decoupled in time. This means that a permanent coupling between the sending of a file for processing, and the processing of that file, is eliminated, and the files are kept in a safe place in the apparatus, this place being coupled or otherwise associated with a particular person, until they are actively called up. This means that the user, when sending files, need not be concerned with the time and circumstances of the processing of his files.

In recent times, the idea of storing a print file and only releasing it on a specified command is being expanded to a concept of logic storage spaces accessible only to the user/owner, in which not only print files, but also all kinds of files, particularly scan files, can be stored, always in such manner that a stored file has to be actively brought up from its destination from a logic storage space of this kind.

For instance, a user may walk up to a digital copier apparatus connected to the network and implementing the logic storage space concept, enter his identity code and start a scanning session. The copier then automatically stores the digital data generated by the scanner unit in executing the job in the logic storage space of the relevant user. Only on a command from the workstation of the relevant user, the copier passes the scan data file to the latter workstation.

The added functionality leads to an increased use, and therewith degree of occupation of the digital copier apparatus. The availability of the apparatus may also be limited by malfunction and maintenance.

Nowadays, the number of copier/printer devices installed in a network system is growing, particularly in large organizations. Therefore, it would be advantageous to expand the concept of print file, or more generally, image data handling to a plurality of connected devices, and offer the user a choice of the device he wants to use at any moment.

SUMMARY OF THE INVENTION

To this end, according to the invention, a network printing system for printing digital print files is provided, the system including: a digital network; at least one personal workstation of a user; a plurality of printer devices, at least a subset of the printer devices having a local memory, an operator control unit provided with inputting means and a display, and a printer unit; and a print service and a print file storage service in which a digital print file includes metadata specifying job information and print image data, the print service including: a receiving module for print files submitted from a workstation of a user, an extracting module for extracting at least part of the metadata of the print file and storing the same in a storage dedicated to the print service, a storing module for storing the print image data of a received print file in a logical storage space allocated to the user in the print file storage service, and a transmitting module for transmitting extracted metadata to at least two of the printers, each the subset of the printer devices further including: a network connection unit, operable for receiving metadata of a print file, and a management unit connected to the network connection unit for including received metadata in a local print file selection mechanism it manages in the printer device, the management unit further being operable to pass a print file for printing to the printer unit only on an operator control command from the operator control unit, which operator control command identifies the print file.

In this way, a user may simply send his print file to the system and walk up to any printer device connected to the system and have his file printed. Also, a preprogrammed subset of the connected printers may receive metadata of a print file and make the file available for selection and printing. For instance, in very large organizations, it may be more appropriate to limit the choice of printer devices to an organizational sub-area, e.g. one building.

The internal structure of the system guarantees that a user will find his print file in the selection mechanism of the printer device he has chosen. In order to do so, the management unit of every connected printer device includes a presentation module for presenting, on the display of the operator control unit of the printer, a list of print files of which metadata are locally available in that printer device, a selection module for permitting an operator to select a print file from the list and to give a command for printing the selected print file, and a fetch module for, in reaction to a selection by the operator, fetching the print data of the selected print file from the print file storage service and transferring it to the printer unit.

In this way, it is not necessary to store the all print files in all printer devices in advance, but, e.g., at only one place, such that network loading is limited.

The print service and the storage service may be implemented in a separate server, e.g. a suitably programmed PC, or in the connected printer devices, or both. In any case, any status changes of a print file, that occur in any of the devices, are communicated to all printers that present that print file for selection and printing, so that the selection mechanism can be kept up-to-date.

The logic storage spaces may have the form of a directory structure in a memory, but also, for example, the form of entries in a database.

According to one embodiment of the apparatus according to the invention, the print service, on receiving from a workstation a digital data file for printing, such file being provided with a user identification, checks whether it already manages a logic storage space for the relevant user, and if that is not the case, the print service creates a logic storage space for the relevant user and stores therein the received digital data file. The creation of logic storage spaces can also take place in response to a program start up at a workstation intended for communication with the system and reporting to the print service on start-up.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 13 and 14 are flow diagrams of a procedure for making a scan profile according to the invention;

FIGS. 16-1 to 16-6 are flow charts describing the general process of an advanced embodiment of the invention, including a plurality of printers;

DETAILED DESCRIPTION OF PREFERRED EMBODIMENTS

Figure 1:
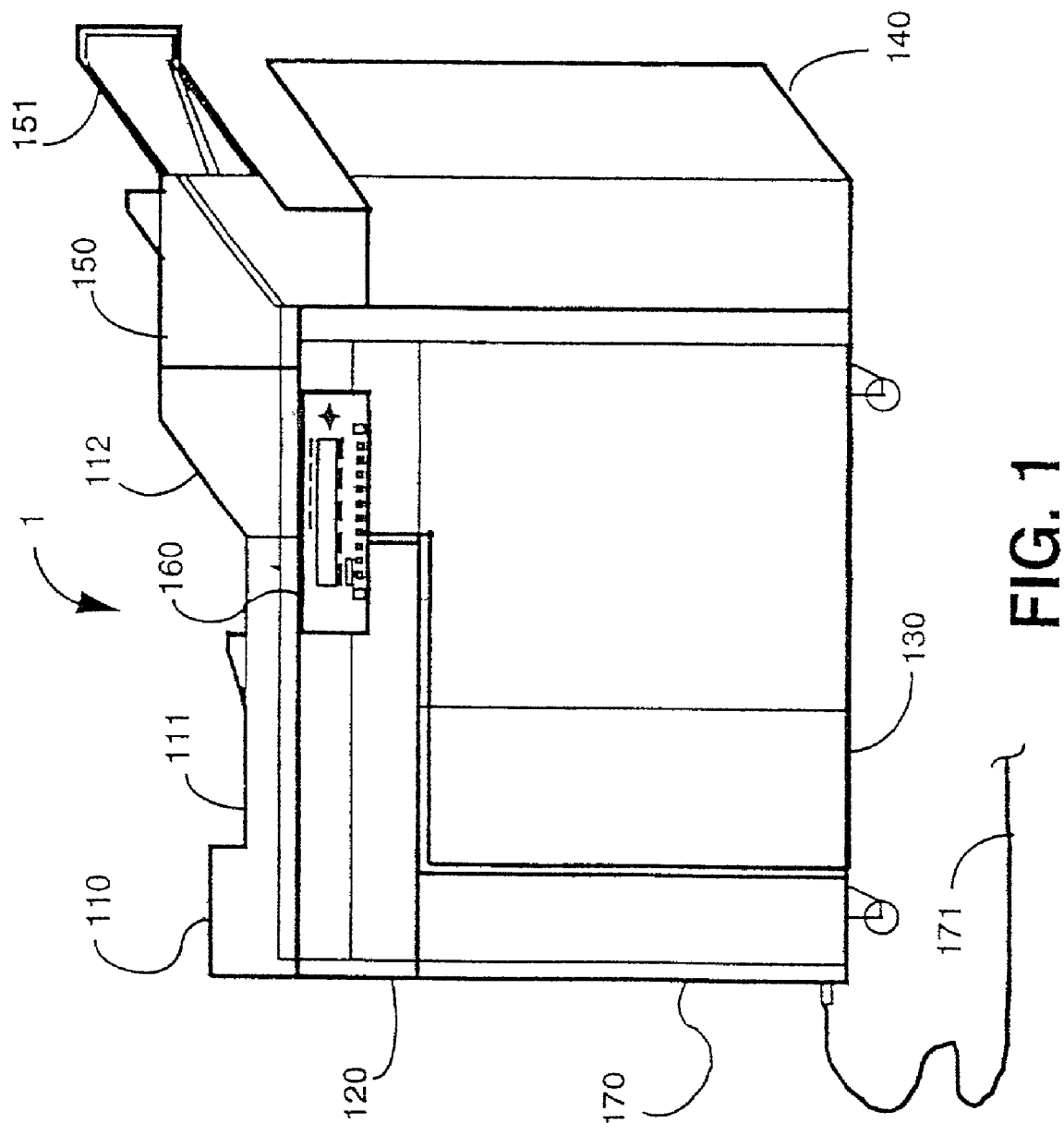
FIG. 1 illustrates an apparatus according to the invention.

FIG. 1 shows the apparatus according to the invention, on which the different parts are separately shown in diagram form.

The document feeder 110 is provided with an input tray 111 for the introduction of a stack of documents, a transport mechanism (not shown) for transporting the documents one by one along the scanner unit 120, and a delivery tray 112, in which the documents are placed after scanning.

The scanner unit 120 includes a flat bed scanner provided with a glass platen on which an original document can be placed, a CCD array and an imaging unit having a movable mirror and lens system for imaging the document on the CCD array. In these conditions, the CCD array generates electrical signals which are converted into digital image data in manner known per se.

The printer unit 130 includes an electro-photographic processing section known per se, in which a photoconductive medium is charged, exposed via an LED array in accordance with digital image data, and is developed with toner powder, whereafter the toner image is transferred and fixed on an image support, usually a sheet of paper.

A stock of image supports in different formats and orientations is available in the supply section 140.

The image supports with the toner image are transported to the finishing and delivery section 150, which if necessary collects them into sets and staples them and then deposits them in the delivery tray 151.

An operator control panel 160 is provided on the apparatus for operation thereof. It is provided with a display and keys and is connected to an operator control unit (not shown here).

The control electronics are shown diagrammatically by reference 170. A cable 171 connects this section of the apparatus to a local network 10 (not shown here).

Figure 2:
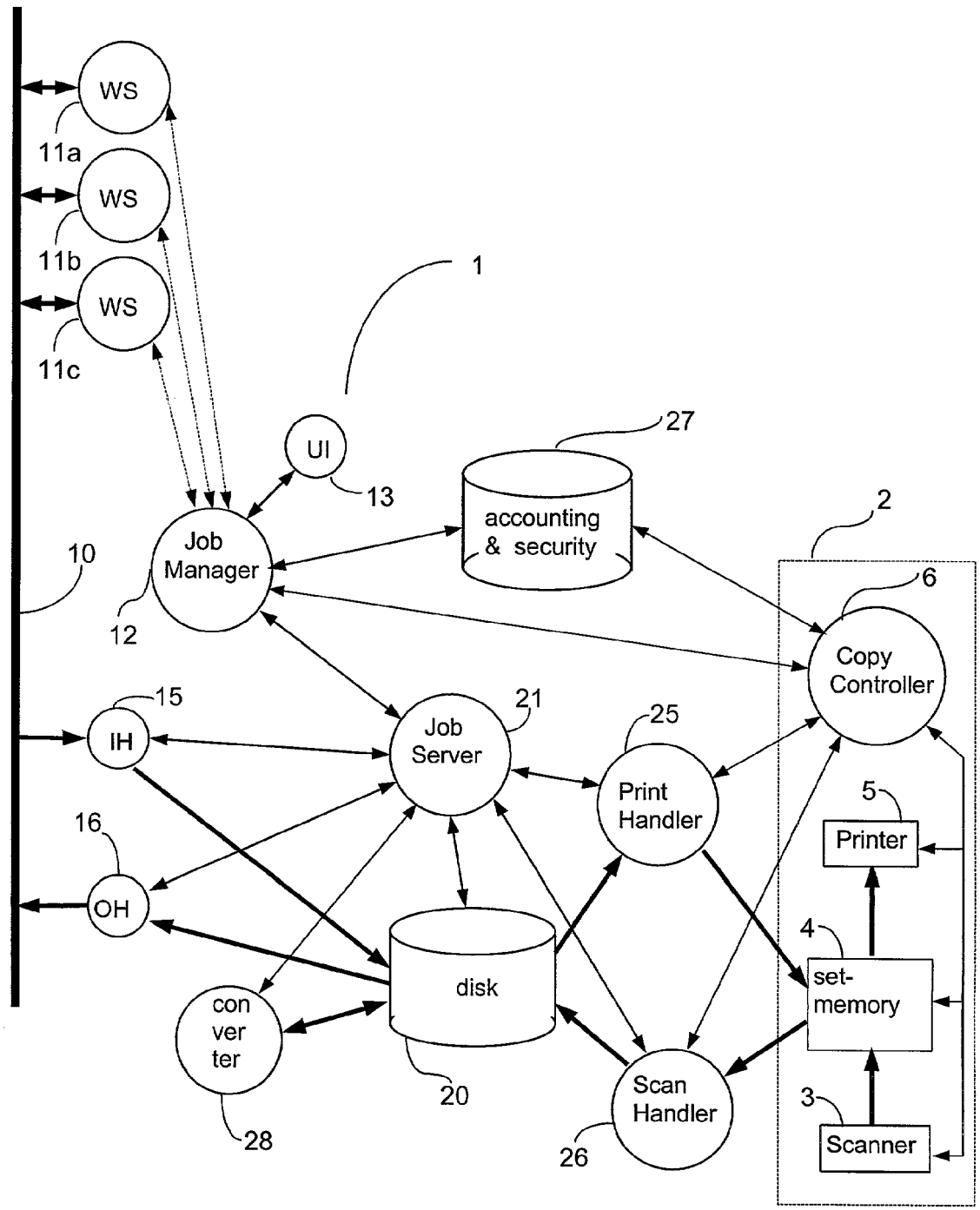
FIG. 2 is a diagram showing the constituent parts of an apparatus according to the invention.

FIG. 2 is a diagram showing the constituent parts of the apparatus according to the invention.

The apparatus 1 comprises a basic unit 2 which contains a scanner unit 3, a printer unit 4, a set memory 5 and a control unit 6 for these units, hereinafter termed the Copy-Controller.

The basic unit 2 contains the units and functions required for making a simple copy. During the scanning of an original document, the scanner 3 generates digital image data and stores them in the set memory 4, whereafter the printer 5 reads out the image data from the set memory 4 and prints them on an image support, usually a sheet of paper. This process is controlled by the CopyController 6. The set memory 4 in this description also includes an image processing function, although this is not essential to the present invention and is therefore not explained further.

The apparatus 1 also includes a number of units required to print digital image data which are fed via a local network 10 from a digital environment, and for exporting digital image data generated by the scanner 3 to the digital environment via the same local network 10.

The term "digital environment" as used here denotes one or more workstations 11a, 11b, 11c, on which a program is operative for communication with the apparatus according to the invention, and which are also connected to the local network 10.

The apparatus 1 is provided with:
a management unit 12, hereinafter referred to as the: JobManager, which manages the processing processes and also updates an administration system for all the copying, scanning and print jobs present,
an operator control unit 13, also termed a: UserInterface (UI), provided with an operator control panel on the apparatus housing, with a display and keys for operation of the apparatus 1,
an InputHandler 15 for receiving and transmitting digital data reaching the apparatus via the network 10 from the digital environment and an OutputHandler 16 for sending digital data via the network 10 to the digital environment,
a storage unit 20 formed by a high-capacity hard disk, a unit 21 hereinafter referred to as a JobServer for managing the data files on the storage unit 20 and for controlling the processing processes,
a control unit 25 hereinafter referred to as a PrintHandler, which is dedicated to providing a printing process, and a control unit 26 hereinafter referred to as a ScanHandler, which is dedicated to providing a scanning process,
an accounting and security unit 27, which inter alia manages the authorization of users and access codes,
a conversion unit 28 for converting digital data files to different formats.

FIG. 2 shows control connections by means of thin arrows and data transport connections by means of thick arrows.

The JobManager 12 is connected to the operator control unit 13, the JobServer 21, the CopyController 6, the accounting and security unit 27 and, via the network 10 and the InputHandler 15 and OutputHandler 16, to the workstations 11a–c. The latter connection is indicated diagrammatically by direct broken-line arrows. Apart from being connected to the JobManager 12, the JobServer 21 is also connected to the storage unit 20, the InputHandler 15, the OutputHandler 16, the PrintHandler 25, the ScanHandler 26 and the conversion unit 28. The CopyController 6 is connected to the scanner unit 3, the set memory 4 and the printer unit 5, and also to the JobManager 12, the PrintHandler 25, the ScanHandler 26 and the accounting and security unit 27.

Digital data files which are sent to the apparatus 1 via the network for printing are either of a first type or a second type. Files of the first type are required to be printed directly, i.e. without further action on the part of an operator at the apparatus, while files of the second type are required only to be stored in the memory of the apparatus and not to be printed until an operator explicitly so requests at the apparatus by selecting via the operator control panel. The type of file involved is apparent from an attribute added to the file.

Processing of a data file of the first type is referred to in this description as automatic printing (AP).

Processing of a data file of the second type is referred to as interactive printing (IP). The procedure with this is as follows (see FIG. 2).

A second type data file for printing sent by a workstation via the network is received by the InputHandler 15. The latter extracts from the file a number of predetermined identification data and passes such data to JobServer 21, which in turn transmits the data to JobManager 12. In this example, the extracted identification data include the name of the owner and the name of the file itself. The file is then stored unchanged in the storage unit 20, whereafter the apparatus passes into the standby mode.

JobManager 12 manages an administration system in which the identification data of all the data files for printing stored in the storage unit 20 are entered. If a new file is supplied via the network, then the JobManager 12 adds the identification data thereof in connection with the name of the owner/sender to the administration system.

The storage unit 20 together with the administration system of the JobManager 12 form, as it were, a set of "logic storage spaces" for data files, each logic storage space being allocated to one user. Thus in actual fact storage in the user's logic storage space means that the file is stored in the storage unit 20 and entered in the administration system in connection with the name of that user. A logic storage space can be protected by a code specific to the owner/user, and in practice this means that an operator can only obtain information concerning the files stored in a specific logic storage space after he has input this code.

There can also be one or more logic storage spaces for general use which are not protected by a code, so that everyone has access to that logic storage space. All kinds of files used by numerous users, for example specific forms, can be stored in a public storage space of this kind.

The manager of the apparatus can set the JobManager 12 so that it does not accept any print jobs which are required to be printed immediately (files of the first type or AP). In that case, the JobManager automatically converts such jobs into interactive print jobs (IP) and stores the data file in storage unit 20 in the form of files of the second type.

When an operator wants to have a specific data file of the second type printed, he must give a command for this via the apparatus operator control panel 160. In response to this, the data file is brought out of the storage unit 20 and converted to printable data by the PrintHandler 25, and after intermediate storage in the set memory 4 the data are processed by the printer unit 5 to produce a print. A print file of the second type can be protected with a code by the sender. This code has the form of an attribute to the print file. If a user wants to print this file interactively, he must input the security code on the operator control panel before the file is printed.

When a data file of the second type has been printed, it remains in principle stored in the storage unit 20 until it is removed by the user himself or the manager of the apparatus. To this end, he gives a command for removal of a selected file. In response to this the JobManager 12 passes a command to the JobServer 21 to erase the intended file from the storage unit 20 and it removes the identification data of that file from its administration system.

Figure 3:
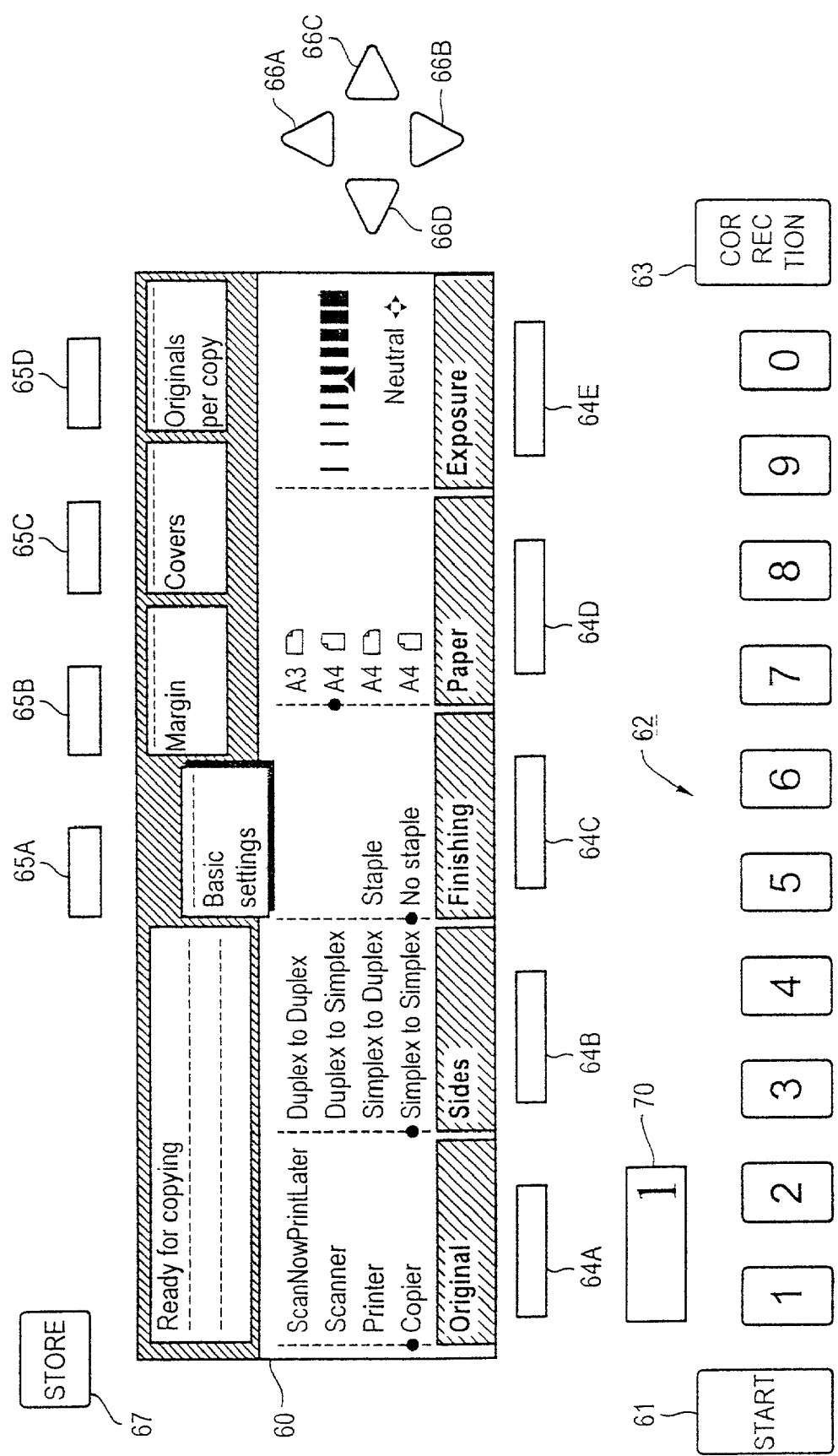
FIGS. 3 and 4 illustrate an apparatus operator control panel, according to the invention, in various situations.

The operator control panel 160 belonging to the operator control unit 13 is shown in FIG. 3 and includes a display screen 60, such as an LCD display, and a number of keys, namely a start key 61, number keys 62, correction key 63, storage key 67 and selection keys 64A–E, 65A–D and the key cluster 66A–D. All these elements are connected to the operator control unit 13, which in response to operation of the keys passes signals to the JobManager 12 and which also controls the display screen 60 to display options and messages to the operator.

When the apparatus has been switched on, the display screen 60 displays an image formed by a number of vertical columns, each situated above one of the selection keys 64A–E. Each column relates to a specific basic function of the apparatus and shows the different possible settings for that basic function. For example, the furthest left column is allocated to the choice between a copying function, in which a document is scanned by the scanner and then reproduced, a printer function for interactive printing, in which a print is made using a data file of the above-mentioned second type sent using the network for printing, a scanner function, in which a document is scanned while generating a scan file that can then be fetched by a workstation, and a deferred copying function ("scan now-print later"), in which a document is scanned while generating a print file of the second type which is stored in the storage unit of the apparatus and can be printed with the printer function. The setting selected at any time, the copying function in this case, is indicated by a marker, such as a dark dot, or by highlighting.

By actuating a selection key an operator can choose a different setting, e.g. in accordance with a cyclic pattern. As a result of a change of a setting the function of one or more of the other selection keys may change, because the old function is no longer relevant and other selection options are required. Different text relating to the new function then appears in the associated column of the display screen 60.

The selection keys 65A–D offer the possibility of bringing up a different set of functions which cannot be displayed by the restricted dimensions of the display screen 60. These are generally functions which are not required for a simple copying or print job, but which offer the operator more options to obtain special printing results. In this example, these functions comprise shifting the margin on the print, adding covers, and originals per copy. The meaning of the keys 65A–D is indicated in an associated field in the display screen 60 directly beneath each key. When one of the keys is actuated the corresponding set of functions is activated and the layout of the display screen 60 is adapted to the associated functions. At the same time, this selection is displayed by framing or otherwise making conspicuous that field on the display screen 60 which belongs to the actuated key of the group 65A–D.

The operator control panel 19 also contains a number display 70 to indicate the number of prints set, as is generally customary on copying machines.

If the printer function has been selected by key 64A in the "basic settings" group, the columns above the keys 64B (simplex or duplex, both in respect of the original document and the copy sheet), 64C (stapling) and 64D (the choice of format of the print paper) relate to the finishing of the copying job and the column above key 64E relates to light/dark control for the copy.

Figure 4:
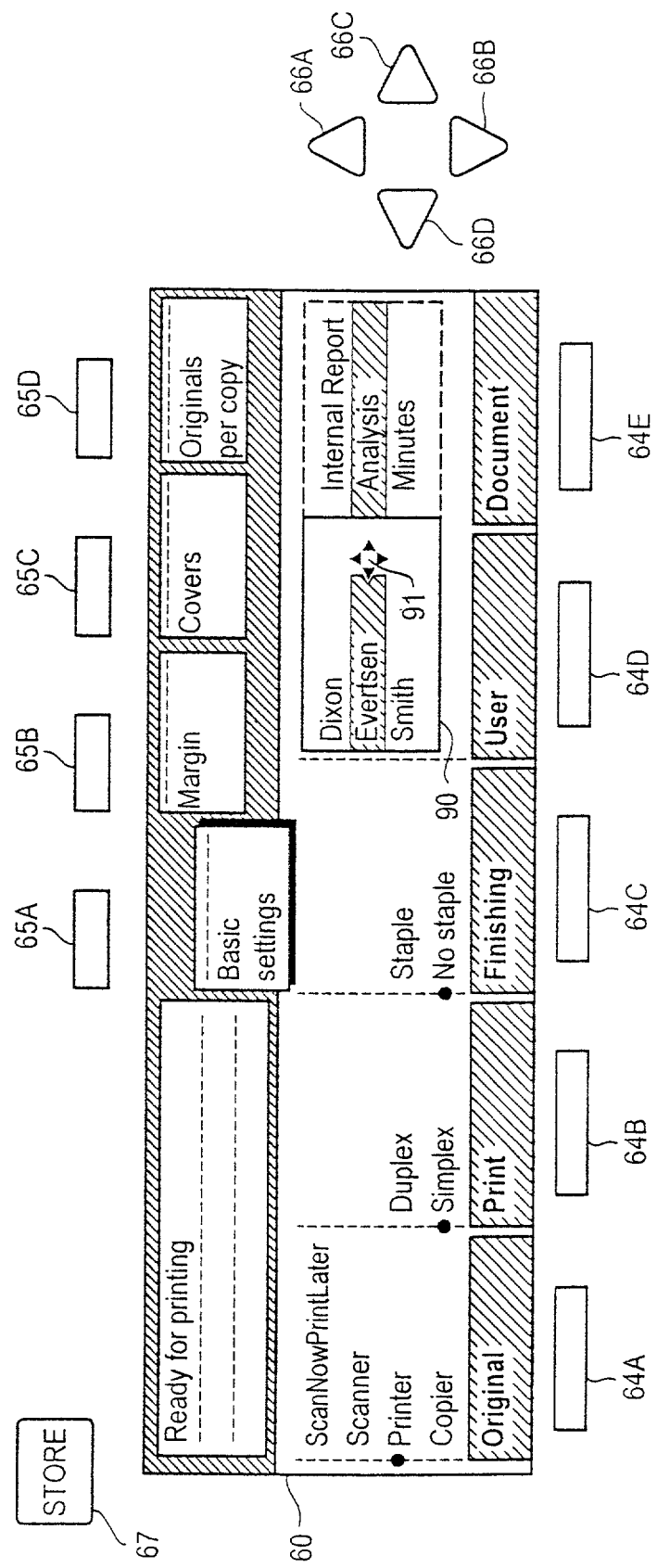

FIG. 4 shows the layout of the display screen 60 after the printer function for interactive printing of data files of the second type has been selected by key 64A in the group "basic settings". In this case the keys 64D and 64E now have the function of specifying the data file for printing by selection of users and file name. Different files of the second type, from different users, may in fact be stored in the memory. All these files are entered in the administration system of the JobManager 12, as described above, and can be displayed on the display screen 60 for selection.

After actuation of key 64D, an operator can select a user name from the list of users who have sent one or more files, and after actuation of key 64E a file name can be selected from the list of files sent by the selected user.

In response to the actuation of key 64D the column on the display screen above this key is provided with a frame 90 and a star symbol 91 to show that a user name can be selected and the star keys 66A–D are active for that selection. As a preselection, the name of the user who last sent a file to the machine is automatically selected as the name.

The pair of keys 66A/B is used to proceed alphabetically through all the user names in the list, forwards with key 66A and backwards with key 66B. If there are more names than can be displayed simultaneously in the frame 90, then as many names as fit within the frame are displayed and the whole list is automatically scrolled through. A bar having text therein in reverse video indicates what name has been selected.

In response to actuation of key 64E, the column of the display screen above that key is provided with a frame and a star symbol in exactly the same way as the procedure on actuation of key 64D as described above, in order to indicate that a file name can be selected and that the star keys 66A–D are active for that selection. The selection with the star keys is exactly the same as to that involved in the selection of a user name. The last file sent is selected, for example, as a preselection.

After selection of a file, the printing process is started by actuating the start key 61.

The operation of the accounting and security unit 27 will now be explained by reference to FIG. 5A and FIG. 5B. This unit both controls access to the copying, scanning and printing, and the accounting for copies, scans and prints made. It has available a database in which an entry can be made for each user by the apparatus manager. For a user, a user code (hereinafter referred to as the "PIN" code) is stored at his user name and a total to which is added the copies and prints made. Each user name also has an authorization code stored to determine the authorization of the relevant user to make use of the apparatus. This can be set up by the apparatus manager, so that access can, for example, be occasionally denied. The authorization can also be automatically denied to a specific user if, for example, a predetermined credit has been used up.

Figure 5A:
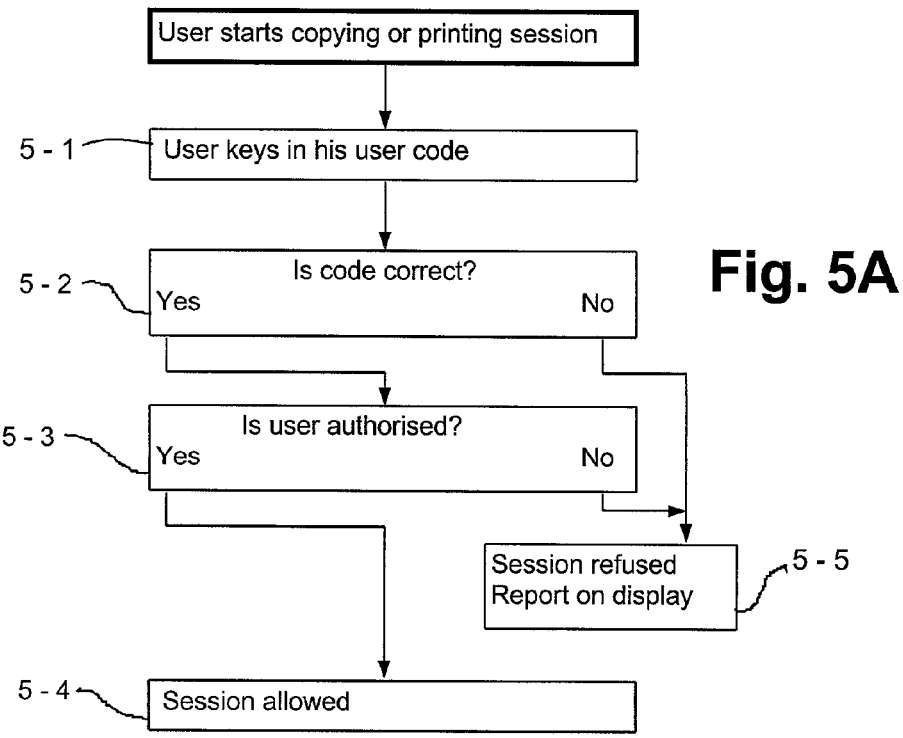
FIGS. 5A and 5B are flow diagrams to explain the operation of the inventive apparatus accounting and security unit.

FIG. 5A describes the case in which a user makes a copy or print at the apparatus. In that case he must first input his user code with the number keys on the operator control panel (5-1). If the code is correct (5-2), the accounting and security unit 27 checks the authorization (5-3). And if this is also in order then the relevant user may make his copies, scans or prints (5-4) and these are added to the user's total usage. If either the user code is incorrect or the user is not authorized, then the unit 27 refuses to release the apparatus for use and reports this on the display on the operator control panel (5-5).

Figure 5B:
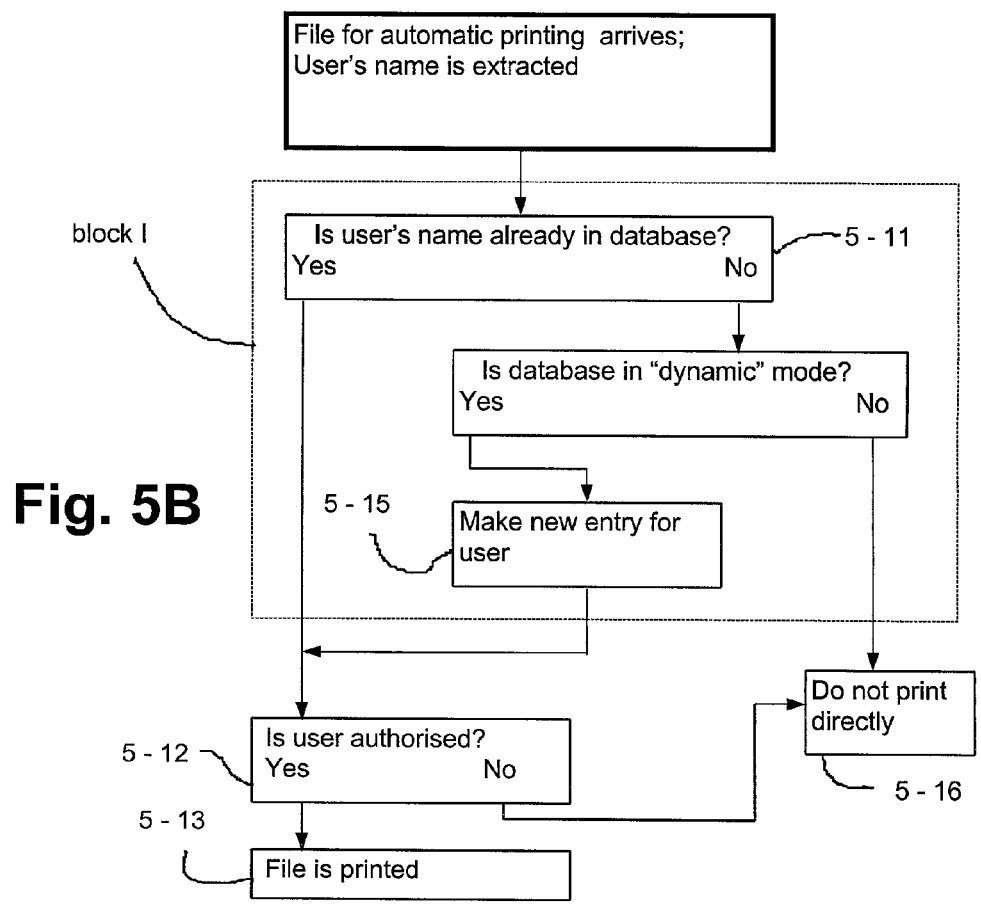

FIG. 5B describes the case in which a user sends a digital data file from his workstation to the apparatus for immediate printing. The task of the accounting and security unit 27 then includes, first, checking whether the user name, which always forms part of the data file, occurs in the database (5-11).

If the database does not contain the user's name for a received print file, then the accounting and security unit 27 makes a new entry in the database (5-15) for this user's name, with an automatic authorization. The mode in which the accounting and security unit 27 does this is hereinafter referred to as the "dynamic mode". It may be that the accounting and security unit 27 has been brought into a different mode, hereinafter referred to as the "static mode", by the apparatus manager, in which case the user's name is not added to the database and the print job is automatically not carried out (5-16). This first treatment is indicated in FIG. 5B in a block I having a broken-line frame.

If the check in block I has a positive result, then the authorization is checked (5-12) and if it is also in order then the print file is processed further (5-13), the prints being added to the user's total usage.

The access system of the accounting and security unit 27 can also be switched off so that anyone can without difficulty copy, scan and, from a workstation, print. In relation to a print job from the operating control panel on the apparatus, the access system remains partially active, namely for protecting individual print files, as will be described hereinafter.

Copying

Figure 6:
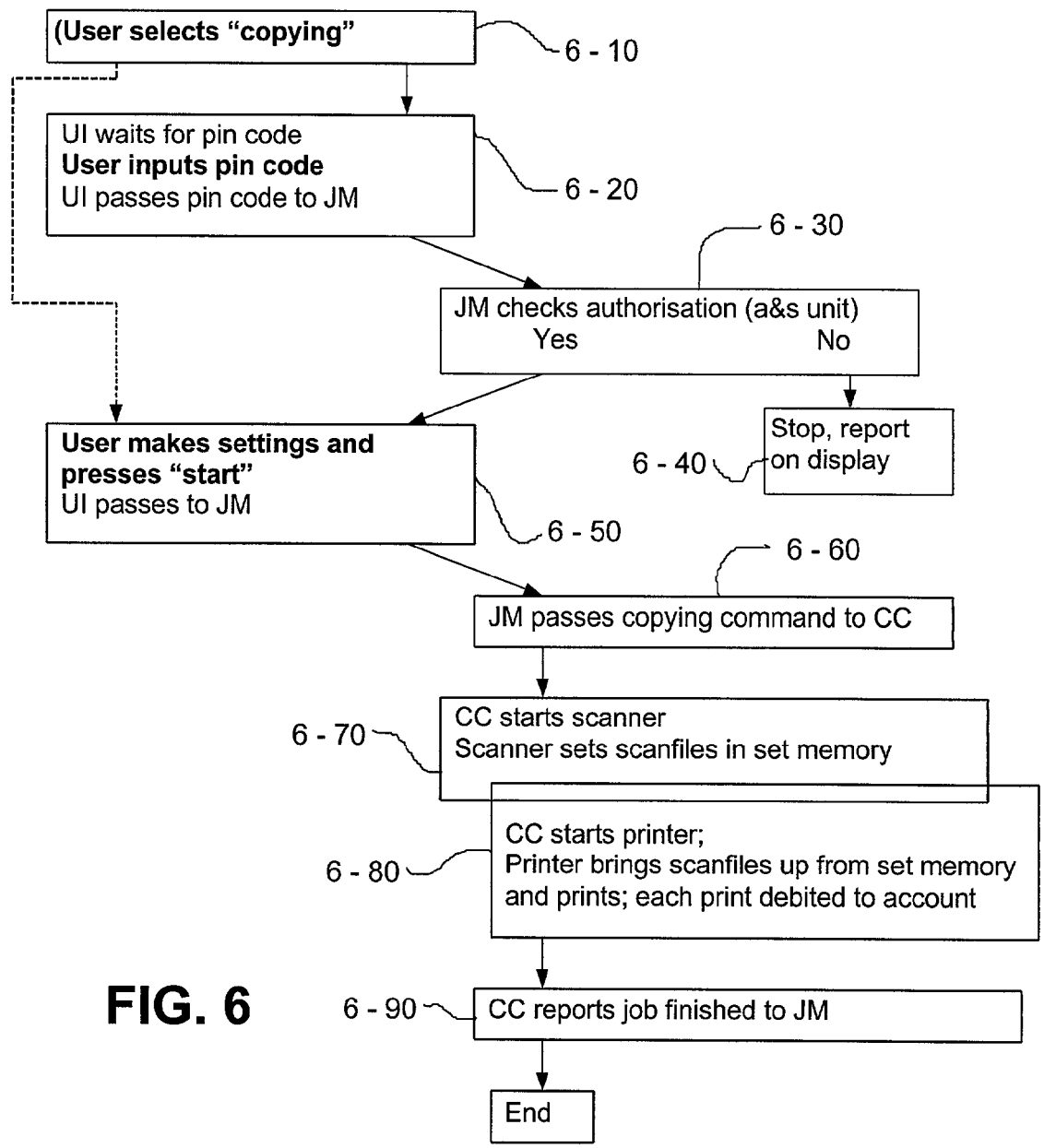
FIG. 6 is a flow diagram of an inventive process for making a copy.

FIG. 6 shows the procedure for making a copy. It is assumed in this case that the access system of the accounting and security unit 27 is switched on.

At the start of the process (6-10), the apparatus is in the "copying" mode or the operator selects that mode with key 64A on the operator control panel 160. The operator control unit 13 now waits for a user code and when the operator inputs this passes it through to the JobManager 12 (6-20). By using the accounting and security unit 27 the JobManager 12 checks the authorization of the relevant user (6-30). If this is not in order, then the JobManager refuses to make a copy and reports this on the display on the operator control panel 160 (6-40).

If the authorization is in order, then the operator can start copying, by making settings for the process on the operator control panel, placing documents in the input tray 111 of the document feeder 110 and actuating the start key 61 (6-50). The settings and the start command are then transmitted by the operator control unit 13 to the JobManager 12.

If the access system of the accounting and security unit 27 was switched off, then step 6-50 immediately follows step 6-10.

The JobManager 12 then gives a command to the CopyController 6 to activate the various parts of the apparatus (6-60). On the command of the CopyController 6 the scanner unit 3, including the document feeder 110, is now started to scan documents one by one and pass the digital data thus generated to the set memory 4, and the printer unit 5 is started to read the digital data out of the set memory 4 and print them on sheets of paper (6-70 and 680).

When all the documents have been scanned and printed, the CopyController 6 reports the job finished to the JobManager 12 (6-90) and the copying action is completed.

Reception of a Print File

Figure 7:
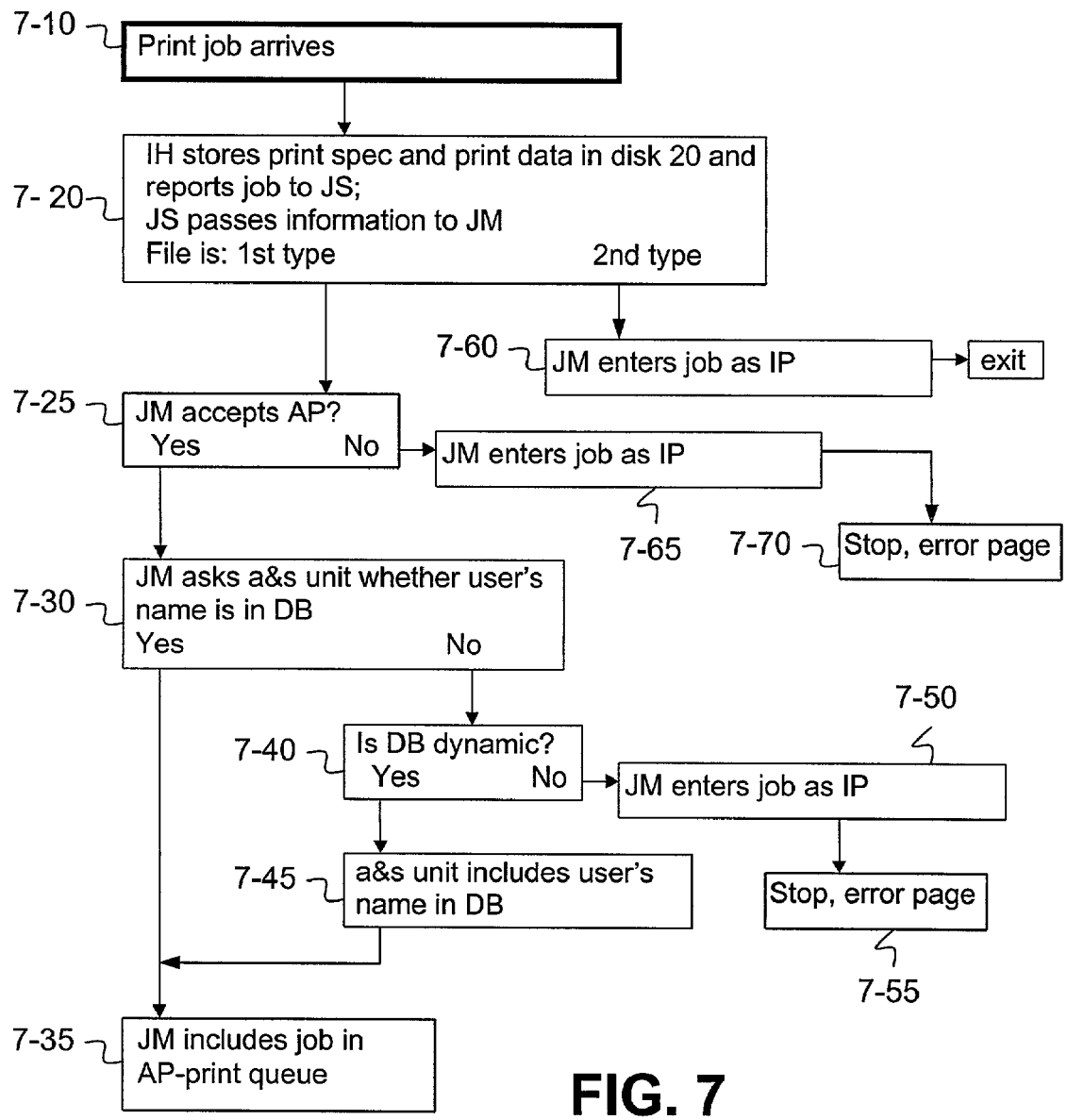
FIG. 7 is a flow diagram of an inventive reception process for print files.

FIG. 7 is a description of the procedure on the arrival, via the network, of a data file of the first or second type for printing.

The relevant data file is received by InputHandler 15 (7-10). This extracts identification data (including the name of the user and of the file) and print specifications (e.g. printing and finishing parameters), determines whether it is a print file of the first (AP) or of the second (IP) type, reports the job to the JobServer 21 and stores the entire file, i.e. the print specifications and the image data for printing, in the storage unit 20 (7-20). The JobServer 21 in turn reports the job, with the relevant data, to the JobManager 12.

If the print file is of the second type, the JobManager enters the job as such in its job administration system (7-60), whereafter no further activities take place in respect of this job.

If the print file is of the first type, the further handling (7-25) thereof depends on whether the JobManager 12 is in the mode in which it accepts automatic print jobs (AP). If not, the JobManager enters the print job in its job administration system as being an interactive print job IP and does not pass to direct printing (7-65). A print-out can be made, however, giving the reasons why the job has not been carried out (7-70).

If the JobManager 12 is in the mode in which it does accept automatic print jobs, it calls in the accounting and security unit 27 to determine whether the job can be processed (7-30). The accounting and security unit 27 proceeds as described in connection with block I in FIG. 5B. If this check (7-40) shows that the file may not be printed, then the JobManager enters the print job (7-50) in its job administration system as being an interactive print job (IP) and does not pass to direct printing. A message can be printed out on a sheet of paper, however, giving the reasons why the job has not been carried out (7-55).

If the check by the accounting and security unit 27 proves positive, the JobManager includes the job in the print queue (7-35) for automatic print jobs (AP-queue), where it has to wait its turn for processing.

Interactive Printing

Figure 8:
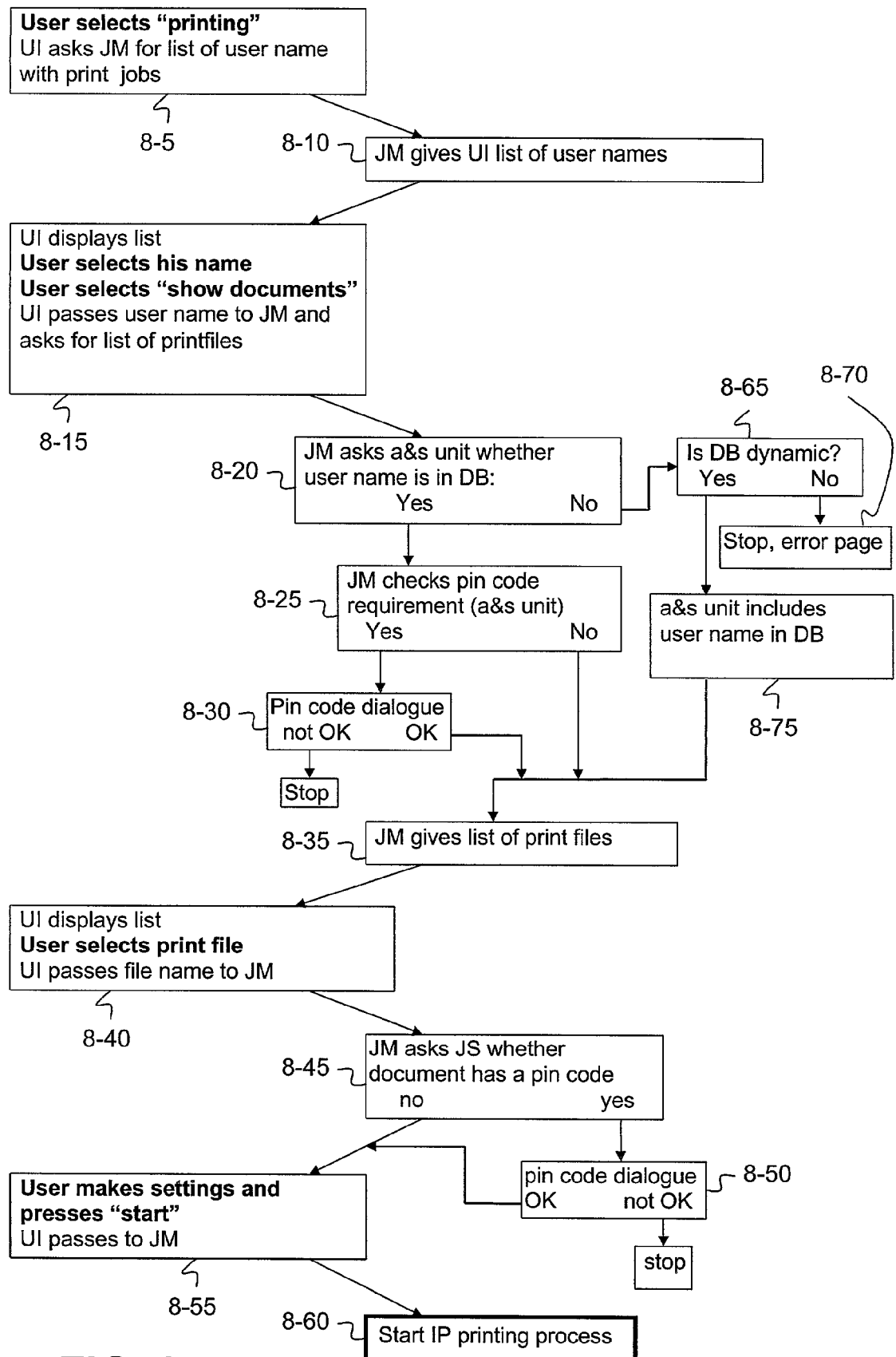
FIG. 8 is a flow diagram of the initial procedure of an interactive printing process according to the invention.

FIG. 8 shows the course of events when a user gives an interactive print order with the aid of the operator control means on the apparatus operator control panel.

The user will start by selecting the print function (8-5) with key 64A (FIGS. 3/4). The operator control unit 13 then passes a request to the JobManager 12 to pass a list of all the users who have sent a print job of the second type that has not yet been processed. In response to that request, the JobManager makes up a current list and passes it to the operator control unit 13 (8-10).

The operator control unit displays this list on the display, in the column above key 64D (FIG. 4), whereafter the user can select his name. After the user has done this, he actuates key 64E to obtain an overview of his own print jobs. In response to this, the operator control unit 13 gives the selected user's name and a request for a list of print jobs of that user to the JobManager (8-15).

The JobManager now asks (8-20) the accounting and security unit 27 whether the relevant user's name occurs in its database. The unit 27 then proceeds as described in connection with block I in FIG. 5B. If the name really does occur in the database, the JobManager asks the accounting and security unit 27 whether there is a user's code for this user's name (8-25), and, if so, it conducts a dialogue with the user through the agency of the operator control unit 13 in order to check the user's code (8-30). If the result is positive, the JobManager makes up a current list of interactive print jobs (8-35) of the relevant user and passes it through to the operator control unit 13, which submits this list to the user for selection on display 60.

The user now selects a print file (8-40) the name of which is transmitted by the operator control unit 13 to the JobManager 12, which in turn asks (8-45) the JobServer 21 whether a security code was sent with the selected file. If so, then through the agency of the operator control unit the JobManager again carries out a dialogue (8-50) with the user to check the code. If the result is positive, the JobManager releases the file for printing, and the user can set finishing parameters on the operator control panel (8-55), whereafter the user can start the printing process (8-60) by actuating the start key 61.

If a user has sent a number of print files each provided with a security code and then wants them all printed interactively, then after a first print file the JobManager in the case of a subsequent print file tries out whether the security code of the preceding protected file is also valid for the current file and will start a new check dialogue with the user only when the current file has a different security code. In this way a user can work faster if he gives a series of print files the same security code. For printing he then only needs to input the code the first time. The use of a single security code is also convenient because the user does not then have to remember a number of different codes.

This procedure is explained by the following example. Let us assume that a user has sent the following series of print files to the apparatus for interactive printing:
File 1, security code 123
File 2, security code 123
File 3, no security code
File 4, security code 123
File 5, security code 456
File 6, security code 456
File 6, security code 123

If the user now selects the files consecutively for printing at the apparatus, he must input the code 123 at file 1, whereafter the JobManager releases the document for printing. File 2 is automatically released because the code of file 1 is also valid for this. File 3 has no security code and is therefore printed without checking. File 4 has the same security code as the preceding protected file, and is therefore automatically released also. File 5 has a different security code, and here the user must again input a code, whereafter file 6 is automatically released. Finally, another code has to be input for file 7, because although this security code was used previously, it is not the code of the preceding protected file.

Printing Process

Figure 9:
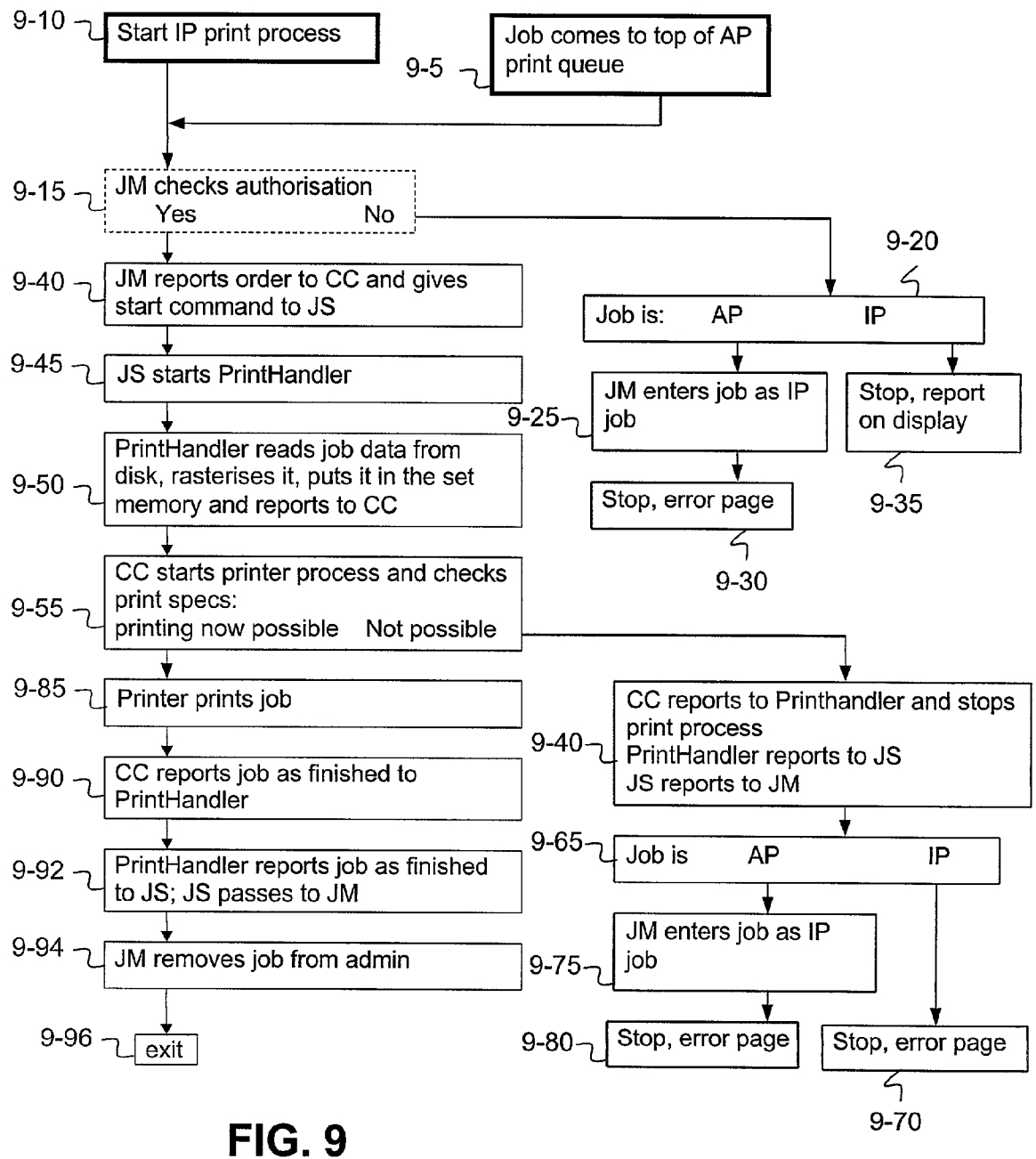
FIG. 9 is a flow diagram of a printing process according to the invention.

FIG. 9 shows the progress of the printing process started either by the JobManager 12 when a print job of the first type (AP) reaches the head of the AP queue (9-5), or by the user as an interactive print job (IP) (9-10). It should be noted here that the JobManager is so programmed as to be able to start an automatic print job only if no activity has been observed on the operator control panel for a predetermined time, e.g. 30 seconds. This prevents a user occupied in a job at the operator control panel from being disturbed by the sudden start of an automatic print job.

If the access system of the accounting and security unit 27 is switched on, the JobManager now first checks the authorization (9-15) of the relevant user (the owner of the print job). If the authorization is not in order, the process is interrupted (9-20). If the print job is an automatic print job, the JobManager records the print file as being of the second type (9-25) and does not print it (9-30). It is possible to make a print giving the reasons why the job has not been carried out. In the case of an interactive print job, the JobManager refuses the order and displays (9-35) a report thereof on the display at the operator control unit 13.

If the user is authorized, the JobManager reports the print job to the CopyController 6 and gives a start command (9-40) for this order to the JobServer, which in turn starts up (9-45) the PrintHandler 25, so that the latter reads the relevant print file from the storage unit 20, rasterizes it, and stores it (9-50) in the set memory 4. On a report from the PrintHandler to the CopyController 6 to the effect that sufficient image data are stored in the set memory, the CopyController starts (9-55) the printer unit 5 to make a print.

In this connection (9-55) the CopyController first checks whether the print specifications belonging to the print job have been satisfied, for example if there is a stock of the required type of image supports (format, orientation, color). If these specifications have not been met, then the job is stopped. The CopyController reports (9-60) this to the PrintHandler, which passes the report through to the JobServer, the latter in turn passes (9-65) it to the JobManager, and the latter reports (9-70), in the case of an interactive print job, the impossibility for printing to be carried out, to the user by a message on the display of the operator control unit 13 or, in the case of an automatic print job, alters (9-75) the description of the job in its administration system to an interactive print job, so that a user can consequently still start the job from the operator control panel at a later moment. Once again a print can be made (9-80) showing the reasons why the job has not been carried out.

If the print job can be processed, the printer unit 5 reads the image data out of the set memory 4, prints them (9-85), and reports (9-90) this to the CopyController 6. When the complete print job has been carried out, the CopyController reports (-92) this to the PrintHandler 25, which passes this to the JobServer 21, and the latter in turn to the JobManager 12, which then removes (9-94) the job from its administration system, thus completing (9-96) the printing process.

Scanning

Figure 10:
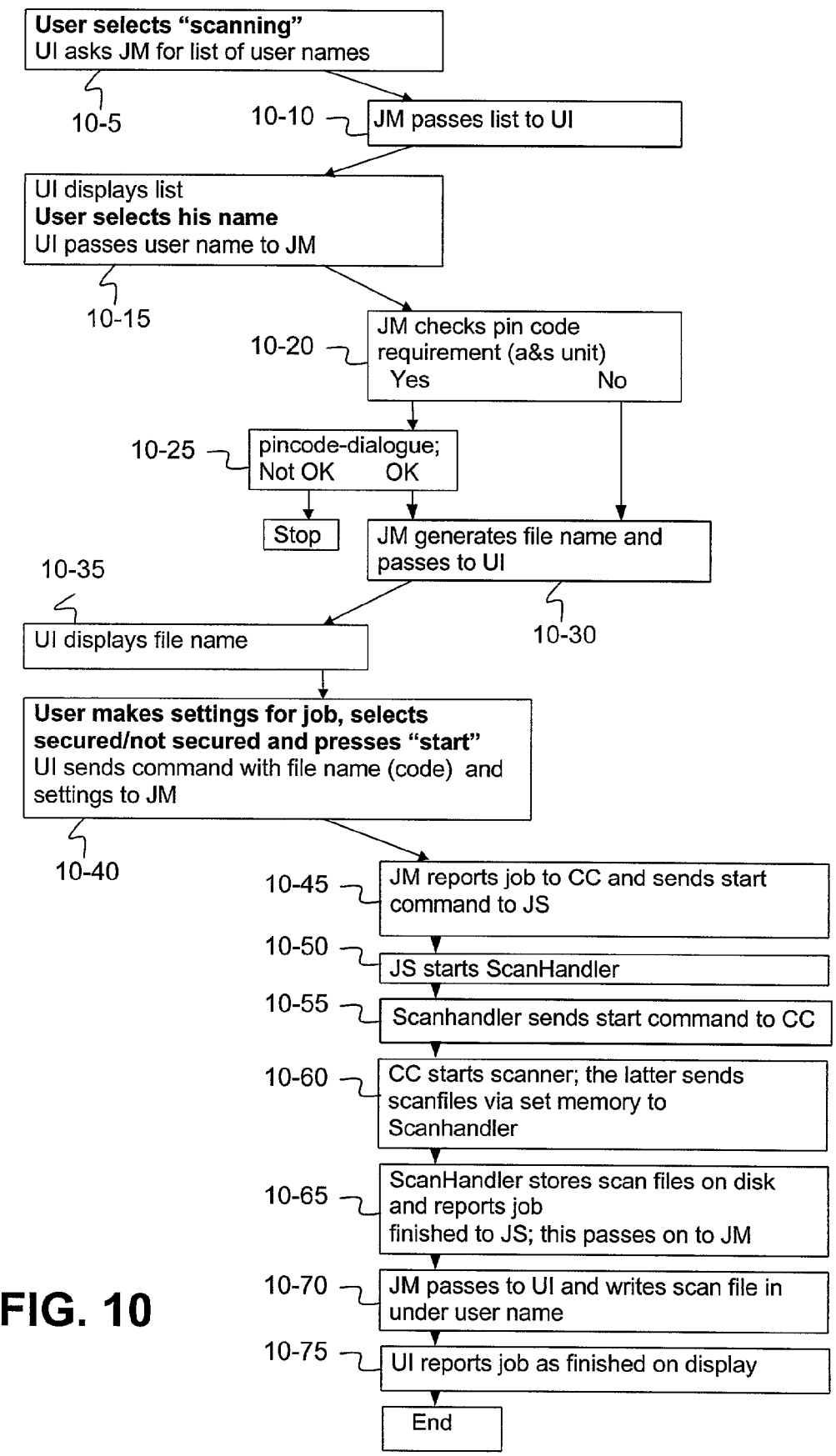
FIG. 10 is a flow diagram of a scan process according to the invention.

FIG. 10 shows the procedure when a user wishes to have a document scanned by the apparatus in order that the digital data generated in these conditions, hereinafter referred to as the scan file, may be further used for processing or storage at his workstation. The scan file in this case is not transmitted to a predetermined address over the network immediately after generation as is usually the case, but is stored in the storage unit 20 of the apparatus, whereafter it must be called up from a workstation. The procedure with this is as follows.

Using the key 64A on the operator control panel of the operator control unit 13 the user selects (10-5) the "scanner" option. In response to this the operator control unit asks (10-5) the JobManager 12 for a list of all the names of users known to the JobManager, i.e.: all the user names in the database of the accounting and security unit 27. As already stated previously, these user names can be entered in the database by the apparatus manager or be automatically added by the accounting and security unit 27 on receipt of a print order from a workstation. Also, when a program intended for communication with the apparatus is started at a workstation this program can automatically be reported to the apparatus JobManager which then ensures that an entry for the user of the workstation is made in the database.

In an alternative embodiment, the user names in the database are provided with an attribute which indicates whether they are authorized to make use of the scan function. In that case the list contains only the names of the authorized users.

Figure 11:
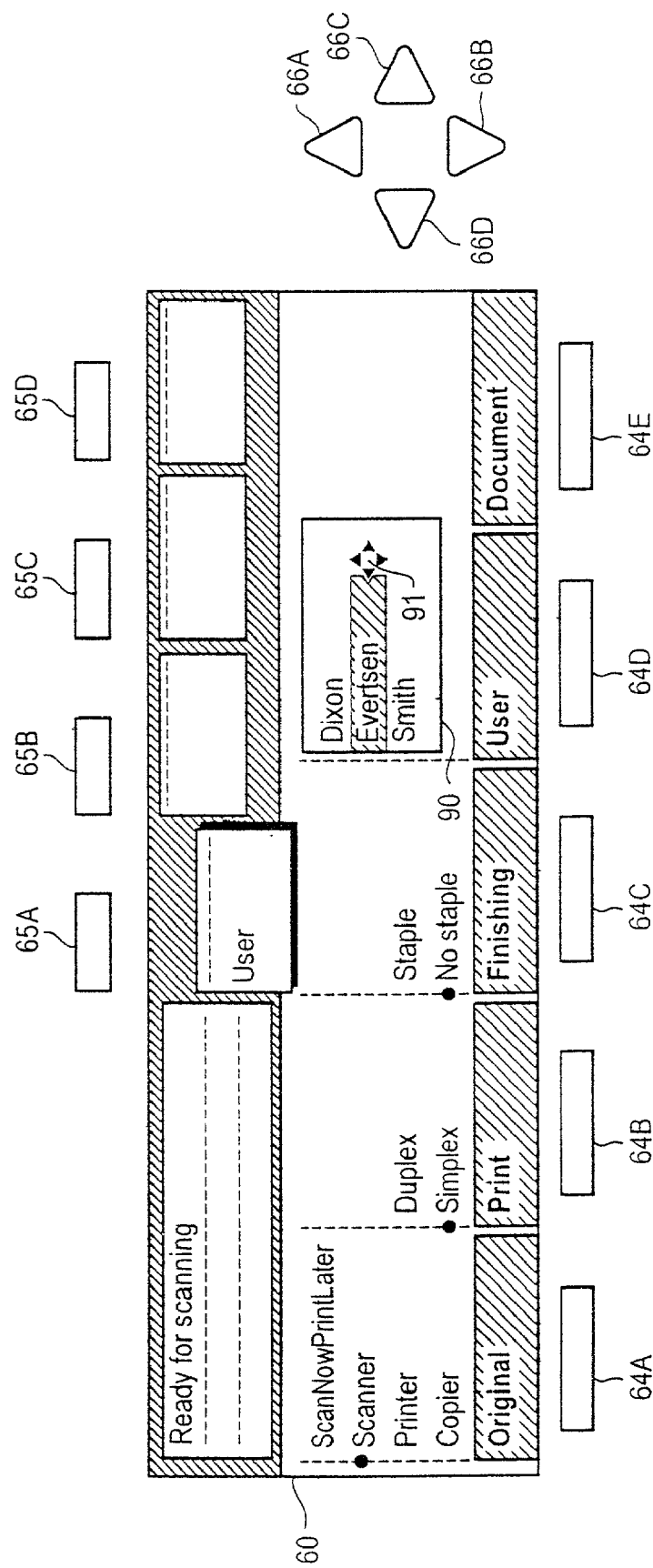
FIG. 11 illustrates the operator control panel according to the invention.

The JobManager passes (10-10) the list of the user names through to the operator control unit 13, which displays (10-15) this on the display 60 for selection by the operator. This is shown in FIG. 11, which illustrates the display 60 after selection of the scanner function.

After the user has selected his name, the operator control unit passes this through to the JobManager 12, which by means of the accounting and security unit 27 then checks (10-20) whether a user code is necessary to obtain access to the scanner function. If that is the case, then by means of the operator control unit 13 it conducts a dialogue (10-25) with the user in order to check his code. In the case of a positive result (10-30), the JobManager releases the scanner function and automatically generates a name for the data file to be made during scanning, and this is passed to the operator control unit 13, which in turn displays (10-35) this file name on the display 60, so that the user subsequently knows the name by which he can find the scan file. This automatically generated name can, for example, have the form:

YYYYMMDDhhmmssxxx, which successively shows the year, month, date, hour, minute and second of the scan action, and the serial number of the document in the scanned set.

In addition, the operator control unit now displays in a form similar to the form for selection (10-40) of settings for a copying or printing process (cf. FIGS. 3 and 4), a possible choice for parameters of the scan process, such as the resolution, the format (e.g. TIFF, BMP, etc.), the magnification factor, and whether the original document is to be scanned on one side or both sides. The user can select his settings from this or he can leave the preselected values as they are. The user then places his original documents in the input tray 111 of the document feeder 110 and actuates the start key 61. In response to this the operator control unit 13 transmits a start command with all the data to the JobManager 12.

The JobManager now reports (10-45) the job to the CopyController 6 and sends a start command to the JobServer 21, which in turns starts (10-50) the ScanHandler 26. The latter transmits (10-55) a start command to the CopyController 6, which controls the scanner unit 3 in order to transport the original documents one by one to the scanner, scan them, and generate scan files. In these conditions the scanner unit counts the number of original pages scanned. The scan files are stored in the set memory 4 and then transmitted (10-60) to the ScanHandler, which stores (10-65) them in the storage unit 20. In addition, the image processing function of the set memory also makes a file with a reduced image of the scanned image, known as a "thumbnail", and this is also stored in the storage unit 20. Thumbnails of this kind are used later for identification in the selection of a scan file.

When all the documents have been scanned, the ScanHandler 26 reports the job as finished to the JobServer, which in turn transmits (10-70) this to the JobManager. The latter passes the finished report (10-75) to the operator control unit 13, which displays it on the display 60 of the operator control panel, together with the number of pages scanned, so that the user can check whether any documents have been skipped. That concludes the scan job.

Scanning with Scan Profile

In a specific embodiment of the apparatus according to the invention, a user can also keep for other scan jobs, settings of scan parameters hereinafter referred to jointly as the scan profile. These parameters are then stored in the storage unit 20 under the user's name in the administration system of the JobManager 12. A scan profile can be brought up later, so that scan jobs can be programmed more quickly. This is described in FIG. 12. The scan profile can also contain an individual name for the scan file made, this name being respected by the JobManager 12 and being used instead of the automatically generated file name, or be combined therewith. This facilitates identification of the file by a user.

Figure 12:
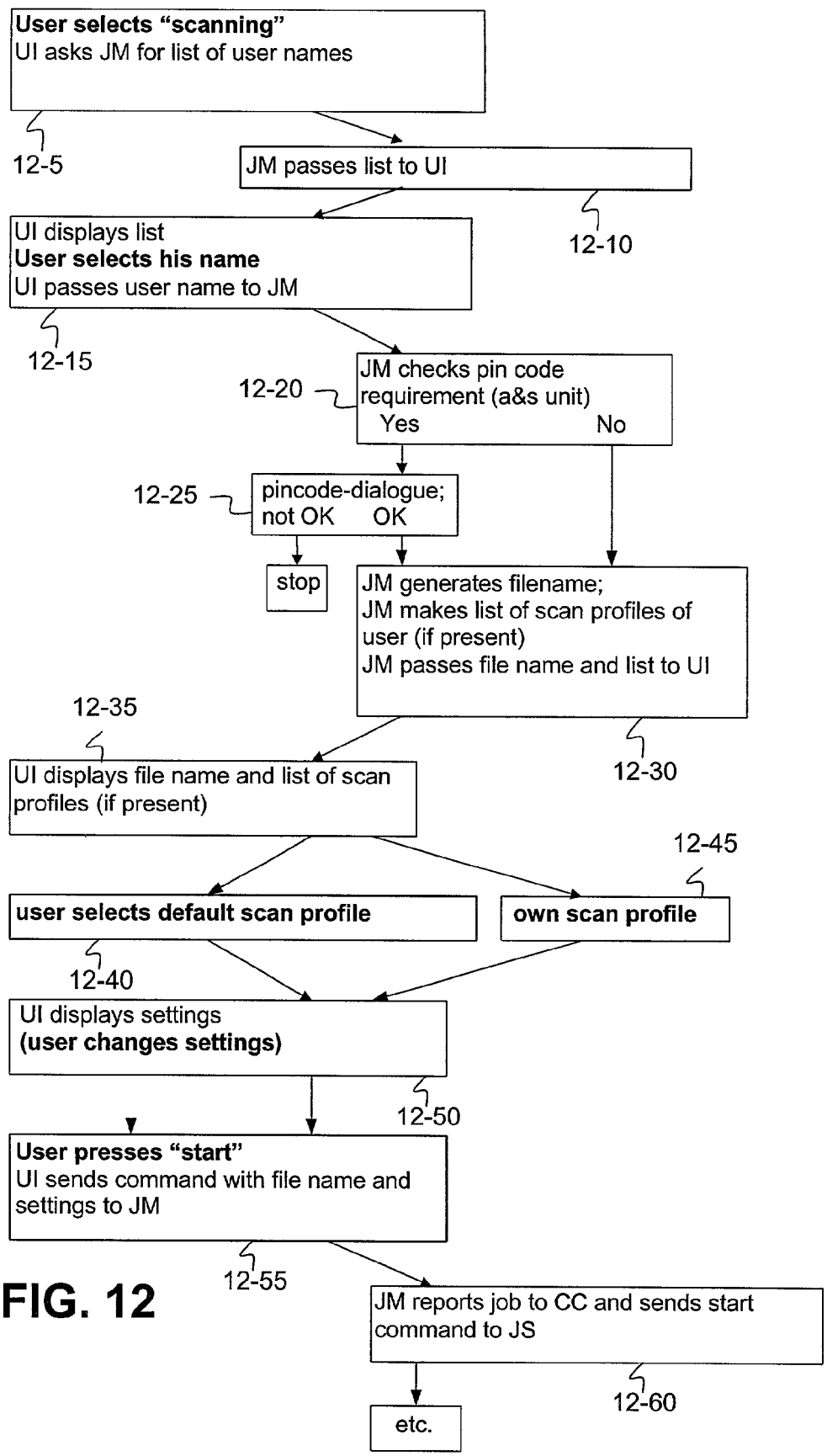
FIG. 12 is a flow diagram of a scan process using a scan profile according to the invention.

FIG. 12 shows the procedure in carrying out a scan job using a scan profile. This differs only in a limited number of points from the procedure described above with reference to FIG. 10. After the JobManager 12 by means of the accounting and security unit 27 has established the fact that a user is authorized (12-5→12-25) to make use of the scanner function and has generated a file name for the job that has just started, it also checks in its administration system whether scan profiles are stored under the name of this user. If so, it makes a list thereof and passes (12-30) it, together with the generated file name, to the operator control unit 13, which displays (12-35) both on the display. Apart from a default profile, one or more profiles for general use can also be added to this list, stored in a public set in the storage unit 20. The reproduction of scan profiles has the same form as that of files for printing in FIG. 4. The default settings have been selected as a preference. The user can now select (12-40, 12-45) a profile from the displayed list. The selection should be confirmed by actuating the key beneath the selection column, whereafter the operator control unit 13 displays the settings of the selected profile on the display. Starting from the settings which are then applicable the user can then change (12-50) one or more thereof. If he then actuates the start key 61 (or if he actuates (12-55) the start key without selecting a different profile from the preselected default profile), the operator control unit 13 transmits (12-60) a start command with the applicable settings to the JobManager 12, and the remainder of the procedure is as described with reference to FIG. 10.

Making and Storing the Scan Profile

FIG. 13 shows the procedure for making and storing a scan profile from the apparatus operator control panel. The storage key 67 is used for this.

In response to actuation (13-10) of the storage key 67, the operator control unit 13 asks the JobManager 12 for a list of all the user names it knows, i.e., all the user names in the database of the accounting and security unit 27.

The JobManager passes (13-20) the list of user names to the operator control unit 13, which displays (13-30) it on the display 60 for selection by the operator. The operator control unit 13 also asks the operator, by a message in the message window on the top left of the display 60, whether the operator wants to make a scan or a print profile. The operator must respond to this by selecting the required function in the left-hand column above key 64A, i.e. in this case "scanner". On this latter selection the selection screen of the chosen function is displayed on the display and the operator can make his settings. If required, he can also use the other sets of parameters, which can be called up with the keys 65A–D.

The operator then again actuates storage key 67 and in response to this the operator control unit 13 sends the user name, function and chosen settings to the JobManager 12, which automatically generates (13-40) a name for the profile, enters (13-60) the profile under that name in its administration system in connection with the user's name and passes the received profile together with the profile name to the JobServer 21 for storage (13-70) in the storage unit 20.

The JobManager 12 then sends the generated profile name to the operator control unit 13, which displays (13-50) it on the display 60, where it subsequently disappears either by the start of a new operation or after expiry of a predetermined interval of time.

The automatically generated file name always has the extension ".pro" and if required can be replaced by a "rename" mechanism from the user's workstation by another more usable name. A standard form can be required, e.g. "sc_XXXXXX.pro", where XXXXXX has a logical text.

Figure 14:
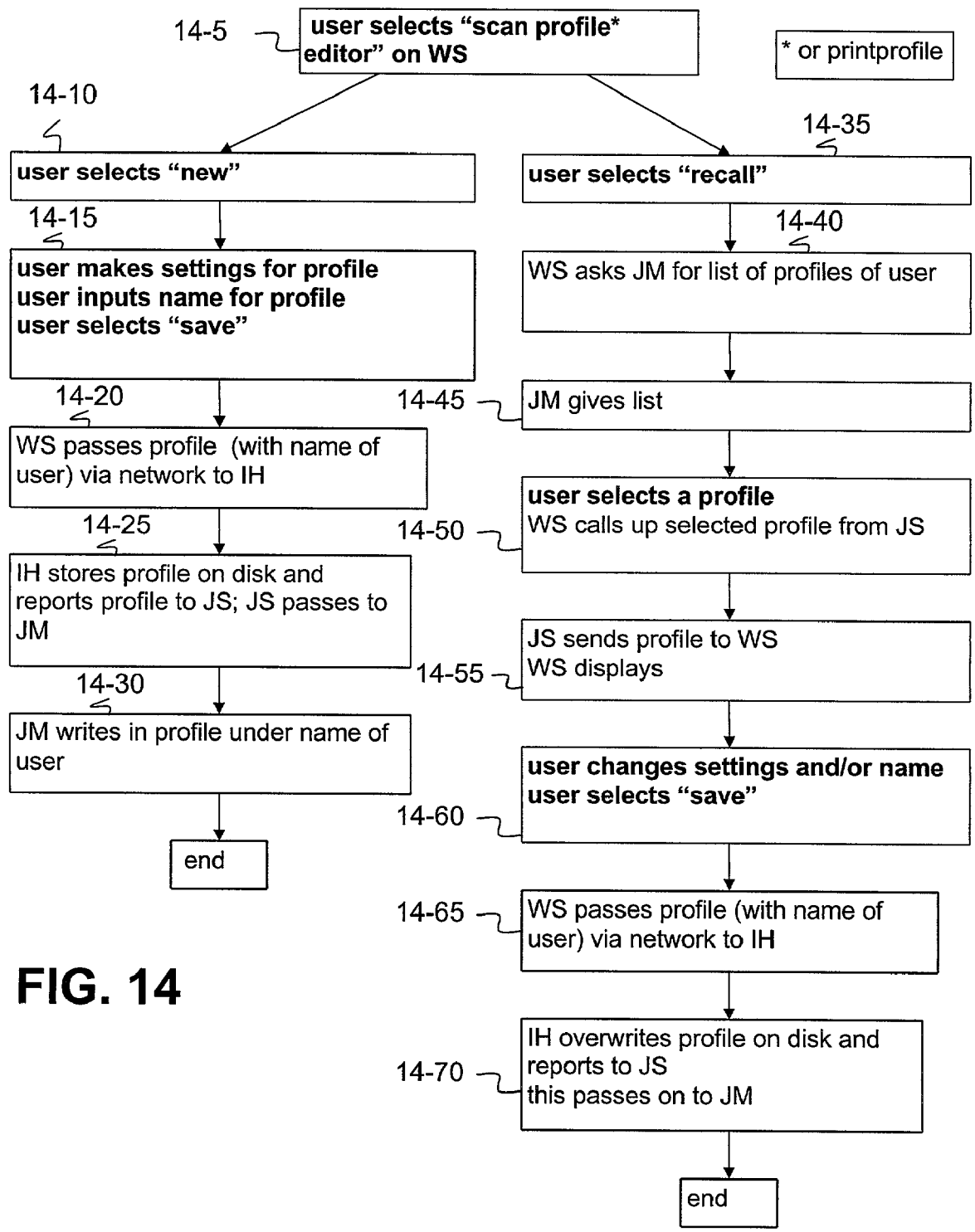

FIG. 14 shows the procedure in making a scan profile or changing an existing scan profile from a workstation. This requires a program specially intended to communicate with the apparatus. This program, which will hereinafter be referred to as the "WS program" has its own user identification and authorization procedure so that the JobManager 12 does not need to repeat this check.

In the WS program a user selects (14-5) a "scan profile editor". Within this subprogram the user can select (14-10) a "new" function, by means of which a new profile is prepared. On the screen at his workstation the user then has a window in which he can set (14-15) all the scan parameters. This can, for example, be an image identical to the image on the display 60 of the apparatus operator control unit 13, with an image of the operator control keys, which can then be operated by means of a cursor, although some other representation can be given.

If the user has made the settings and given a name for the profile, then on his command ("save") the profile is transmitted (14-20) via the network to the InputHandler 15, which stores (14-25) it in the storage unit 20 and reports it to the JobServer 21. This passes information concerning the profile to the JobManager 12, which enters (14-30) it in its administration system.

The user can also amend an existing scan profile, both in respect of the scan parameter settings and the name. This is possible by selecting (14-35) a "recall" function in the scan profile editor. The WS program then asks (14-40) the JobManager 12 for the scan profiles stored under the name of the relevant user, and the JobManager 12 gives (14-45) an overview, which is then displayed on the workstation screen for selection. After the user has selected (14-50) a specific scan profile, the WS program asks the JobServer 21 for the contents of that profile, and the JobServer 21 brings it from the storage device 20 and sends (14-55) it via the OutputHandler 16, whereafter it is displayed on the workstation screen. The user can now make changes (14-60) and use the "save" command to save them, whereupon the WS program sends (14-65) the new contents of the profile to the apparatus, where it is again stored (14-70) in the storage device 20 and reported to the JobManager 12.

The name of a scan profile always has the extension ".pro".

Fetching a Scan File Using Workstation

Figure 15:
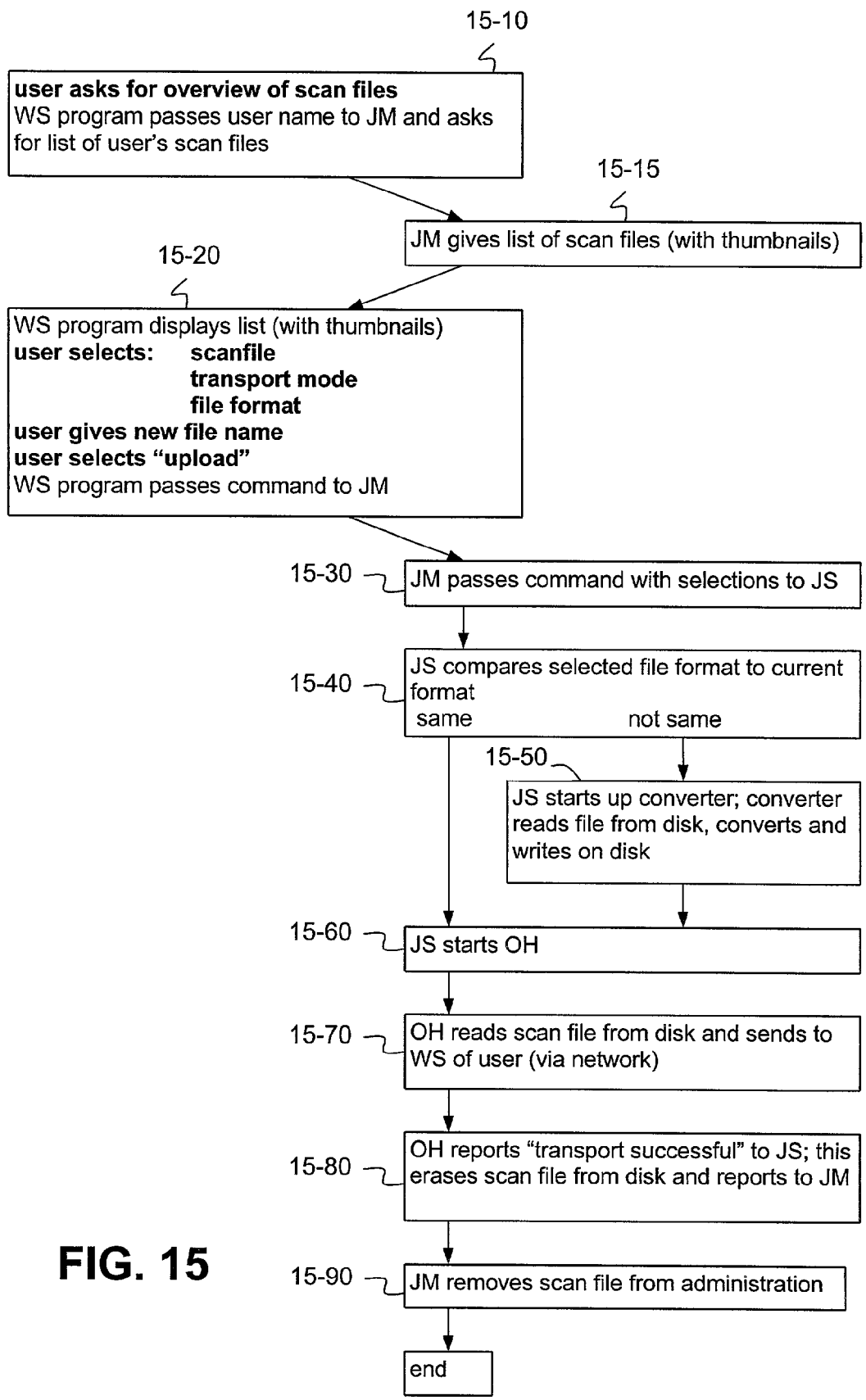
FIG. 15 is a flow diagram of a procedure for fetching a scan profile from the apparatus according to the invention.

FIG. 15 shows the procedure when a user wishes to fetch a scan file stored there under his name, using his workstation.

The WS program for communication with the apparatus is also required for this operation. As already stated, this program is provided with its own user identification and authorization procedure.

In the WS program, the user now selects a presentation function for all the scan files stored under his name in the storage unit 20. The WS program then asks (15-10) for the list of these from the JobManager 12, which compiles the list from its own administration system and sends (15-15) it back. In addition, the JobManager 12 by means of the JobServer 21 and OutputHandler 16 sends to the workstation the thumbnail belonging to each scan file. This can, for example, also be the thumbnail of the first page of a multi-page document.

The WS program now displays (15-20) on the workstation screen the list of scan files with the associated thumbnails for selection by the user. The user is also offered a choice for the transport mode (encrypted or not), the required format of the file, and the name under which the file is to be imported (note that the file still has an automatically generated name which contains no information as to the contents). After making the settings, the user selects the function "upload", whereupon the WS program sends a request to the JobManager 12 to forward the selected file. The JobManager passes (15-30) the order to the JobServer 21, which compares (15-40) the required file format with the current format in which the file is stored in the storage unit 20. If the two formats are different (15-50), the JobServer 21 gives the conversion unit 28 an order to read out the file, convert it, and store it again in the storage unit 20.

The JobServer then starts (15-60) the OutputHandler 16 to transmit (15-70) the file to the workstation. When it has completed its task, it reports (15-80) this to the JobServer 21, which erases the file from the storage unit 20 and passes it on to the JobManager 12, which in turn removes (15-90) the file from its administration system. Alternatively, the scan file can be kept until the user removes it actively.

Print Profile

The use of a profile having previously prepared settings can also be used for interactive printing of print files (described with reference to FIG. 8). In that case, in the step in which the print files are displayed for selection, the profiles, now referred to as print profiles, are also displayed. Prior to selection of a print file, the user can now first select a print profile, whereafter the operator control unit 13 adapts the settings thereto. The user then selects a print file, whereupon everything progresses as already described with reference to FIG. 8. If the user does not select a profile, then the default settings remain operative.

The making and storing of print profiles is completely similar to the making and storing of scan profiles. In this connection reference should be made to the descriptions of FIGS. 13 and 14. A print profile will have the general name "pr_XXXXXX.pro", where XXXXXX has a logical content.

Deferred Copying

A "deferred copying" function is also supported by means of the described embodiments of scanning and printing. In this function an original document or a set of documents is scanned, whereafter the digital image data thus generated are stored in the storage unit 20 under the user's name, and can then, at a later time, be brought up for printing. This progresses as follows.

The function is started by selecting the option "deferred copying" (scan now—print later) in the column above key 64A on the operator control panel. This is then followed by exactly the same procedure as described with reference to FIG. 10 or FIG. 12 for the scanning of documents, in which case the file of generated image data is now so administered by the JobManager that when the interactive print function is called up it is included in the list of files for selection for printing. The process is completed on completion of the scan job.

In order then to print the file, a user should select the option "printer" in the column above key 64A on the operator control panel, in which case as already described the scan files of "deferred copying" jobs are now also displayed for selection in the column above key 64E. The printing process is fully identical to that described with reference to FIG. 8.

In an alternative embodiment, in the case of "deferred printing", after completion of the scanning process the scan file is not stored as an interactive print job, but is added by the JobManager 12 to the print queue for automatic print jobs (AP queue) and automatically printed when it comes to the head of the queue. This embodiment is suitable particularly for situations in which the apparatus is placed in a central reprographic department, in which jobs are processed in a continuous series.

Special Applications

A print file of the second type (IP) can be provided with an extra attribute by the WS program, so that when received in the apparatus according to the invention it is stored in the storage unit 20 under the name of a user other than the sender. In this way, a specific file can also be distributed over a group of users. The recipients, who can be warned by e-mail, then have the opportunity of having the file actually printed for their own use. If required, the recipients can also first bring up the intended print file to their workstation, in exactly the same way as described with reference to FIG. 15 in connection with scan files. After inspection of the file and the decision that it should really be printed, they then send the file, optionally as a file of the first or second type, back to the apparatus for printing there.

The possibility of receiving print files from other users can be programmed for a specific user by means of the JobManager, there being added to the entry of that user in the database of the accounting and security unit 27 a data item which either authorizes the receipt of such files or not. This data item can if required be so extended that it authorizes only the receipt of files from specific other users referred to in the data item, and hence obstructs those of other users.

Advanced Embodiment for a Plurality of Printers

In an advanced embodiment of the invention, a plurality of printers as described herein can be combined into a system and a user may freely choose one of the printers for printing his print jobs of the second kind (IP jobs). In this system, print files are submitted in the very same way as described above. The jobs can then be selected and printed on any of the printers of the system. This embodiment will hereinafter be called "unchained-printing". It may encompass all printers that are connected to the system, but also a sub-set thereof. Indeed, the sub-set may be different for different users, for instance depending on their physical location. The said sub-set may be programmed into the workstation program for submitting jobs or it may be administered at system level.

In the following description, the terms "print file" and "print job" are used indifferently. They are meant to relate to the same entity, although stressing different aspects of it, namely the data file aspect and the administrational aspect, respectively.

Generally, the advanced embodiment includes a server function and a print data storage function, both of them processes which may be implemented in one of several ways and in different physical locations in the system, to be described below.

Figures 1, 16:
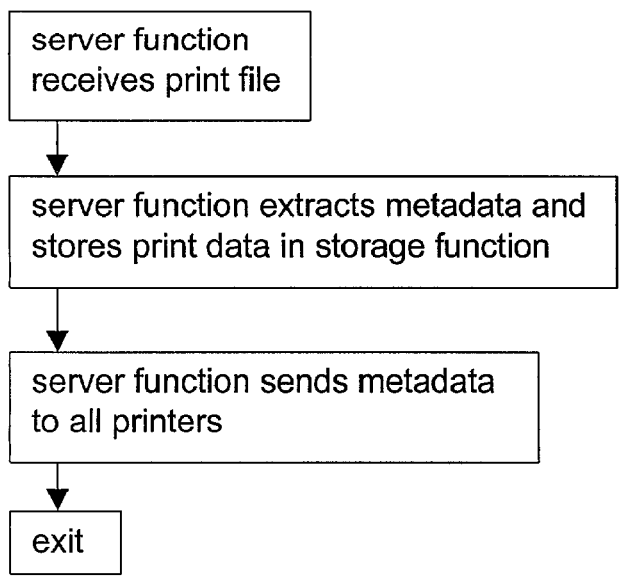
Figures 2, 16:
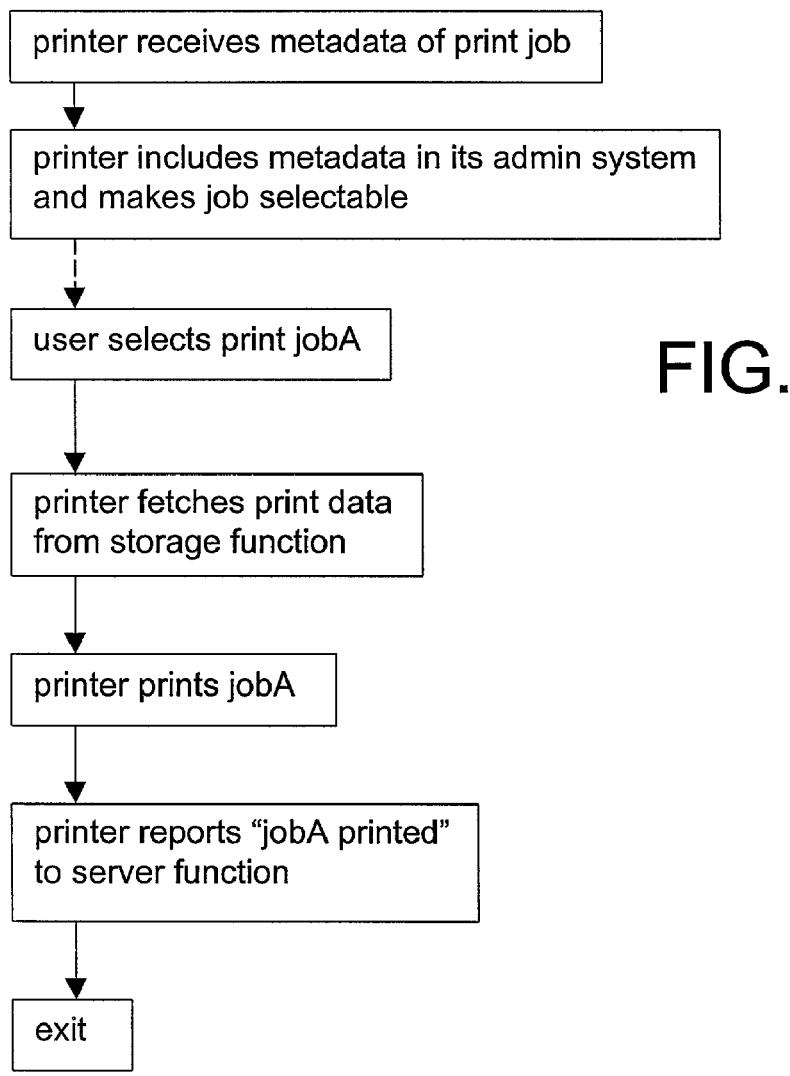
Figures 3, 16:
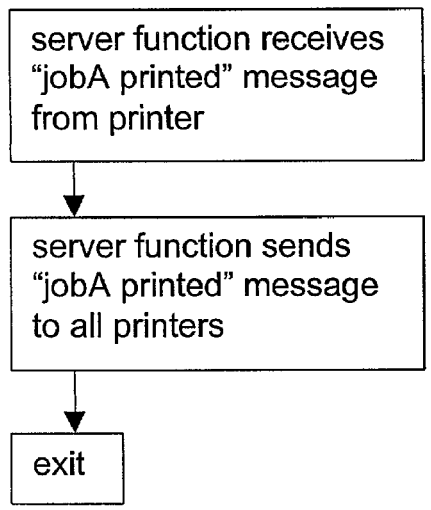
Figures 4, 16:
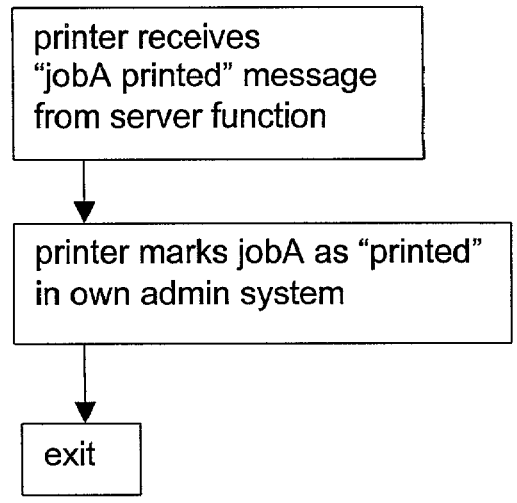

The general process is shown in FIGS. 16-1 to 16-6.

FIG. 16-1: A print file is received by the server function. The server function stores the print data in the print data storage function and extracts identification data of the print file (which include the name of the user and the name of the file, the security code (if present), the time of arrival of the print file in the system and the print settings) which herein will be called "metadata". Then, the server function sends the metadata to all connected printers.

FIG. 16-2: The printers all include the jobs in their administration systems and make them selectable for printing, even though they may not have the actual print data stored on their disks. When a user now selects a job at the console of one of the printers, the latter downloads the print data from the print data storage function and prints the job.

FIGS. 16-3 and 16-4: After having printed the job, the printer sends a message to that effect to the server function, which instructs all printers to mark the print job as "printed" in their administration systems and selection lists. Marking a job as "printed" may be effected by displaying a mark (a "tick sign") next to the file name in the list.

Figures 5, 16:
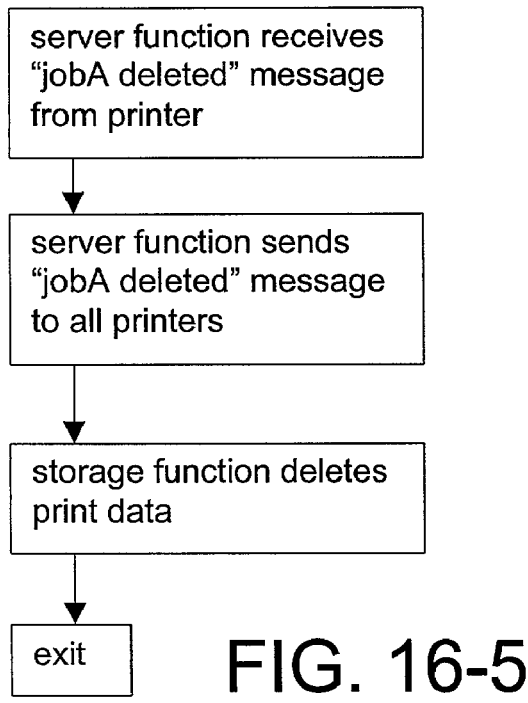
Figures 6, 16:
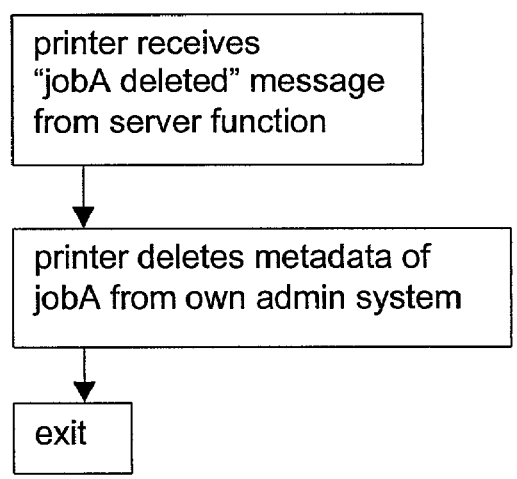

FIGS. 16-5 and 16-6: When a print job is deleted by a user at the console of any of the printers, that printer sends a message to that effect to the server function, which deletes the print data of that job from the print data storage function and instructs all printers to delete the job metadata from their administration systems. A "time-out" function may be included within the server function to automatically erase the print data of a print job from the storage function and to instruct the printers to delete that print job from their administration systems, after a predetermined time interval since the time of arrival of the print file in the system.

Figure 17:
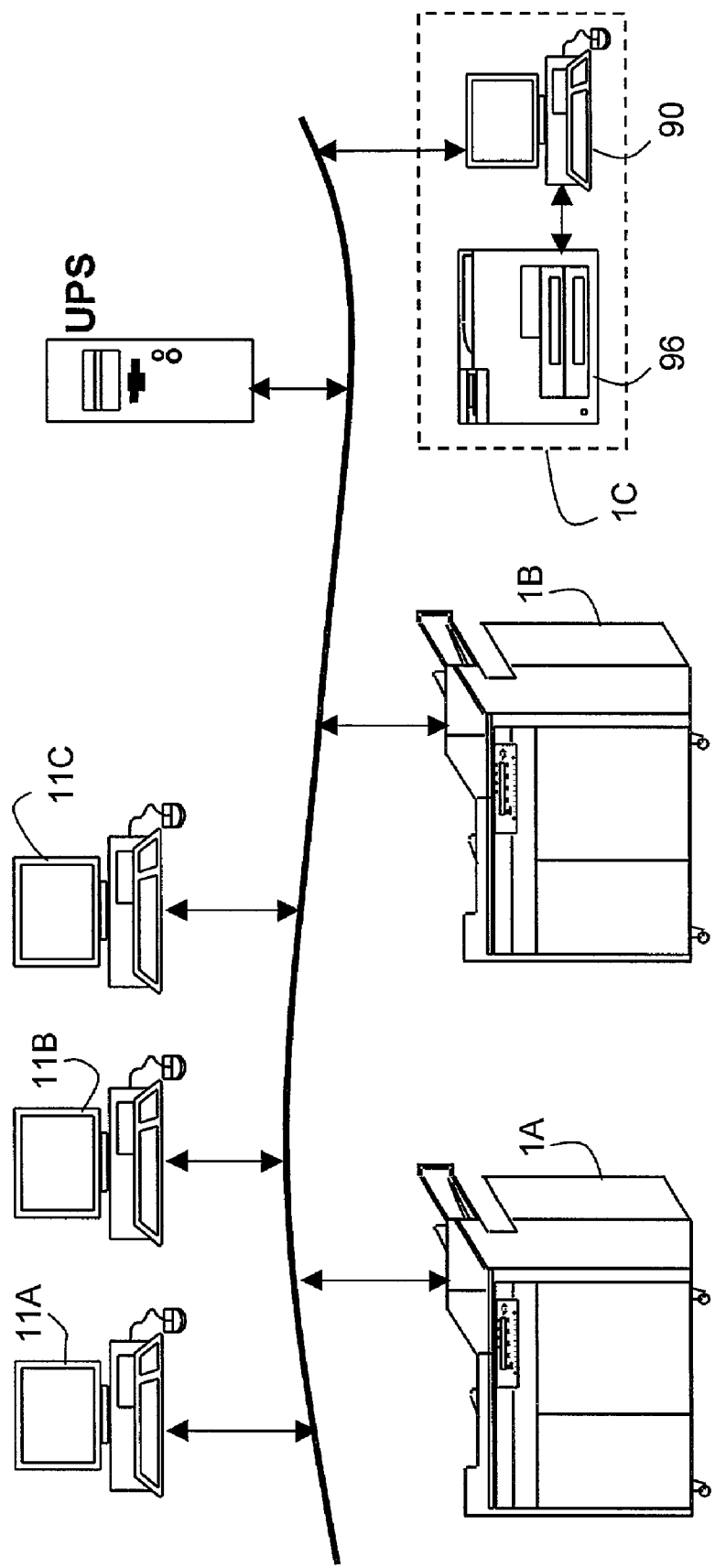
FIG. 17 is a general outline of a system corresponding to the advanced embodiment.

Unchained-printing can be implemented in several ways. Three implementation examples are described below. Reference is made to FIG. 17 for a general outline of the system, including a plurality of workstations 11A, 11B, 11C and printers 1A, 1B, 1C, and an Unchained Printing Server UPS, all connected to the network 10. Printers 1A and 1B are dedicated printers having full functionality for unchained printing, while printer 1C is a normal network printer 96 provided with a server 90 having full or limited functionality for unchained printing.

In a first implementation, the UPS performs both the server function and the storage function. The UPS may be a PC having a high capacity hard disk. The UPS receives and stores all print files, extracts the metadata and sends the metadata to all connected printers. In operation, the dedicated printers 1A, 1B include the jobs in their administration systems and make them selectable for printing, although they have not stored the actual print data on their disks. When a user now selects a job at the console of one of the printers, the latter downloads the print data from the UPS and prints the job.

In a second implementation, of which the hardware is similar to that of the first implementation, print files are submitted to a particular printer, at the choice of the user (or as programmed in his printer driver). Upon reception of the print file, the addressed printer stores the file internally, extracts the job metadata and sends them to the UPS, which fulfills the rest of the server function. Thus, the UPS transmits the metadata to the other printers. The other printers all include the jobs in their administration systems and make them selectable for printing. When a user now selects a job at the console of one of the printers, and the print data of that job are not stored locally in that printer, the latter downloads the print data from the printer that has stored them and prints the job.

In a third implementation, the server function and the print data storage function are fully distributed. Therefore, a physical server device is not needed. Print files are submitted to one of the printers in the very same way as described above. Upon reception of the print file, the addressed printer stores the file internally, extracts the metadata and sends them to the other printers. The other printers all include the jobs in their administration systems and make them selectable for printing. When a user now selects a job at the console of one of the printers, and the print data of that job are not stored locally in that printer, the latter downloads the print data from the printer that has stored them and prints the job.

The processes for handling a print job will now be described with reference to FIGS. 18–26. It should be noted that the variant of the invention enabling a user to make use of any of a plurality of connected printers is in principle intended for interactive print jobs. Automatic print jobs may still be submitted, but they will normally be processed by the particular printer to which they have been submitted, unless that printer's JobManager is in the mode in which it does not accept automatic print jobs. In the latter case, it converts the print file into one of the second kind (IP), and further proceeds as described below. However, a printer receiving an automatic print job also reports it to the UPS, which in turn informs the other printers. The other printers then make the job selectable for printing.

The following description is applicable to the second embodiment mentioned above (print files submitted to and stored in one of the printers, and metadata distributed via a UPS), except as indicated otherwise. The skilled person will have no difficulty in devising the modifications necessary for the other implementations.

Figure 18:
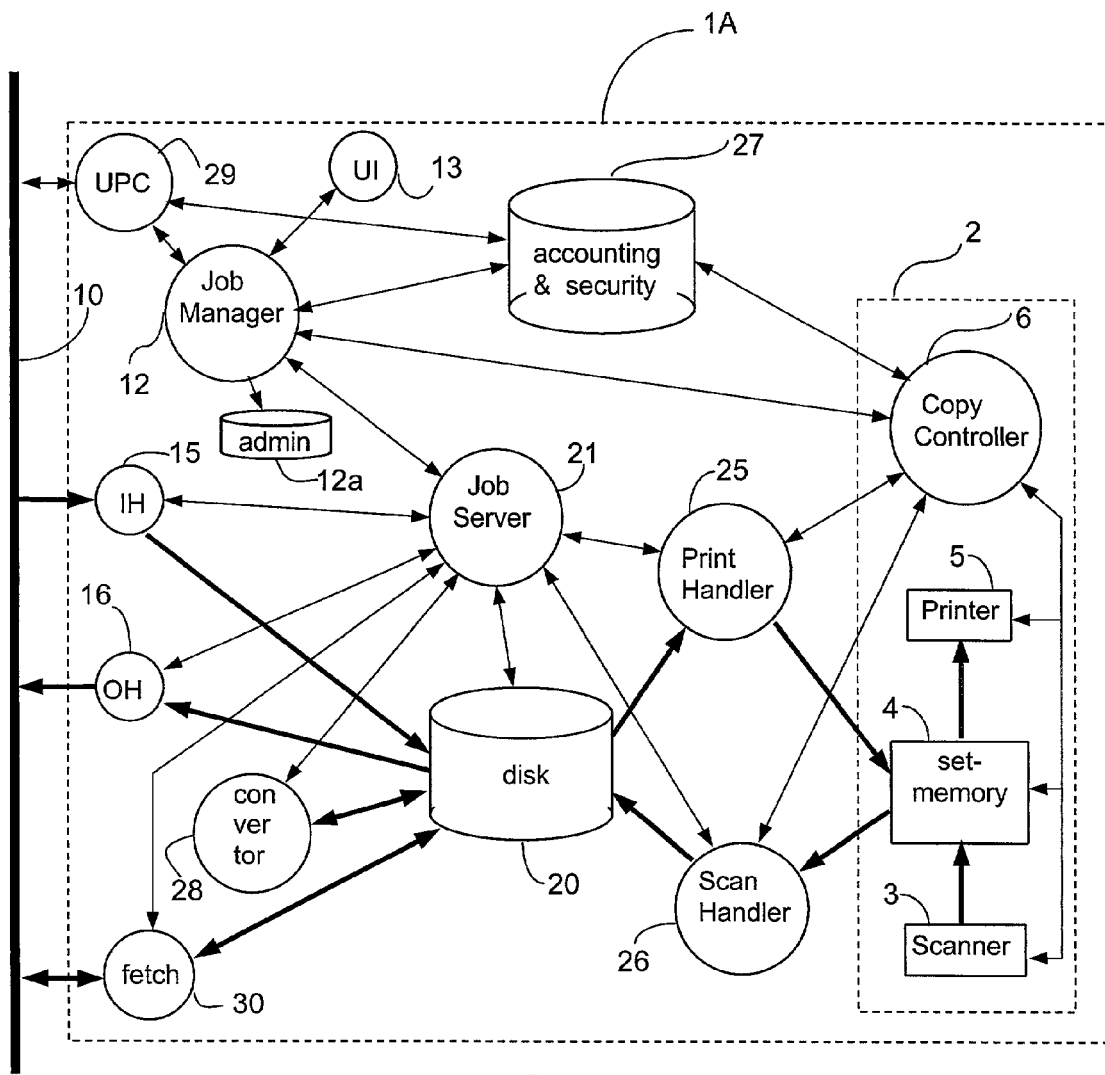
FIG. 18 is a diagram showing the constituent parts of an apparatus according to the advanced embodiment of the invention.

FIG. 18 is a diagram showing the constituent parts of a dedicated printer device 1A for unchained-printing according to the advanced embodiment of the invention. Although being almost identical to the apparatus of FIG. 2, the device of FIG. 18 has an additional unchained-printing client (UPC) 29 connected between the JobManager 12 and the network 10 for communicating with the unchained-printing server (UPS). Further, it includes a fetch module 30 for fetching a print data file from the print data storage function, in this case another printer, via the network 10, under the control of the JobServer 21. The administration system for jobs, maintained by the JobManager 12, is shown as element 12a.

Figure 19:
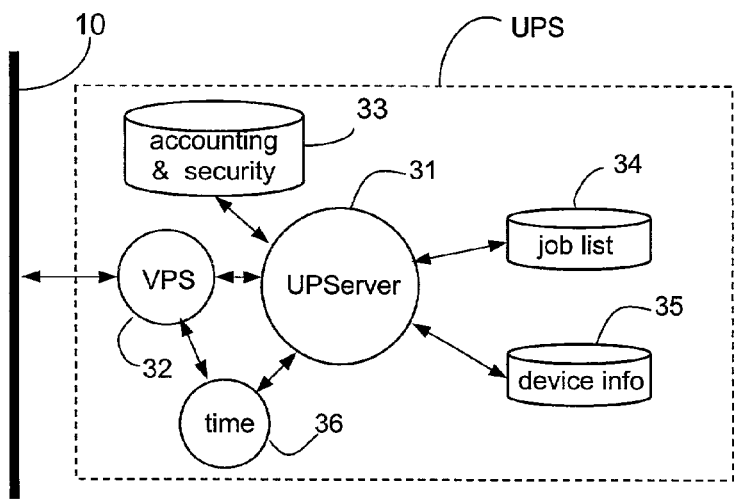
FIG. 19 is a diagram showing aspects of an unchained-printing server.

FIG. 19 is a diagram showing aspects of the Unchained-printing Server UPS. This includes the UPS module proper 31, which controls all processes, and a Virtual Printer Server 32. The UPS module 31 maintains three databases, one (33) including accounting and security information, a.o. permissions of users, one (34) including the list of the metadata of all jobs in the system and one (35) including information on the printers connected. Further, the UPS includes a time server 36 for synchronizing the workstations, the printers and the UPS, e.g. by using the well-known SNTP protocol.

The Virtual Printer Server (VPS) 32 manages the communication between the printers and the UPS module 31. It exchanges messages with the printers when:
a new print file is received (IP or AP) at any of the printers
printing of a print file finishes (IP or AP)
a print file is deleted by a user (IP or AP) at any of the printers
accounting and security data (e.g. permissions) are changed
a printer issues a request for the metadata of all jobs in the job list 34 (necessary for updating the job administration 12a of the printer)
a printer issues a request for the device identifiers of the connected printers (necessary for fetching print data of a remotely stored print job)
a printer issues a request for an update of its accounting & security information Further, the VPS 32 senses when:
a printer goes down
a printer comes up.

The accounting and security database 33 of the UPS and those of the printers (27) are synchronized in order to assure that they contain the same information. Any changes in permissions and credits are entered by the system administrator in the database of the UPS and are then automatically distributed by the UPS to the corresponding databases in the printers. Also, when a print file of an as yet unknown user arrives at a printer, and the JobManager 12 of that printer extracts the user name and updates its accounting and security database 27, the said JobManager also informs the UPS, which updates its database 33 accordingly and informs the other printers.

A mechanism for keeping the job lists consistent at any time is described now. When a printer goes down or gets disconnected, this is detected by the VPS and reported to the UPS, which reacts by deleting all jobs from that printer from its job list 34 and instructing the other printers to do the same. When the connection is restored, the VPS establishes a new communication with the printer, and the latter reports all its jobs as new jobs to the VPS. The VPS then reports these jobs to the UPS module 31, which inserts the jobs in its job list 34 and instructs the other printers to do the same.

When a printer does not receive a clear response from the UPS on a request, it presumes that the connection has been broken and in reaction deletes all jobs that are not locally stored from its job administration system 12a. However, it keeps sending requests for all job metadata. When a request is successful again, the printer updates its job administration system and again makes all jobs available for user selection.

Reception of a Print File

Figure 20:
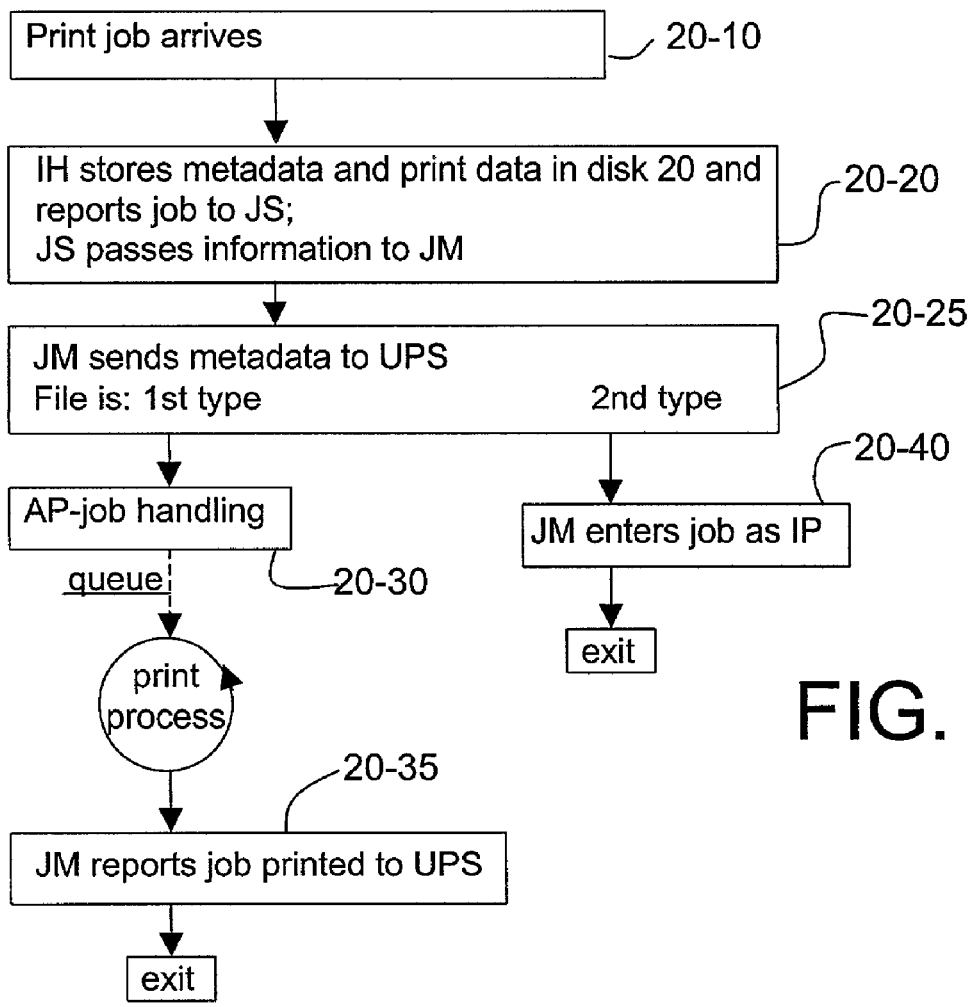
FIG. 20 is a flow diagram of a reception process for print files.

FIG. 20 is a description of the procedure followed upon the reception at one of the printers 1A, via the network, of a print file of the first or second type.

The print file is received by InputHandler 15 (20-10). This extracts identification data (including the name of the user and of the file) and print specifications (e.g. printing and finishing parameters), determines whether it is a print file of the first (AP) or of the second (IP) type, reports the job to the JobServer 21 and stores the entire file, i.e. the print specifications and the image data for printing, in the storage unit 20 (20-20). The JobServer 21 in turn reports the job, with the relevant data, to the JobManager 12.

The JobManager passes the metadata of the print file and a code identifying the printer itself to the UPS via its UPC 29 (20-25). If the print file is of the second type (IP), the JobManager enters the job as such in its job administration system (20-40) and ends its activities in respect of this job. If the print file is a file of the first type (AP), it is handled (20-30) in much the same way as described herein with respect to FIG. 7. After it has been printed, however, the file is not deleted, but reported as printed to the UPS (20-35). The UPS then instructs all printers to mark the file as printed, which will be explained hereinafter.

The UPS receives the metadata of a newly received print file (AP or IP) via Virtual Printer Server 32 and stores them in the job list 34. Then, the UPS sends the metadata and the device identifier code to the other dedicated printers (e.g., 1B) through the VPS 32. In this way, even a print file of the first type (AP) can also be printed by any of the other connected printers. This has the advantage, that if a user walks to the addressed printer for collecting his (automatically printed) prints, and he finds a line of other users waiting for their turn while his own print job is still in the queue, he may go to another printer and print his job there. When the printing of an automatic print file is started elsewhere in this way, the starting of the print process is communicated to the UPS, which instructs the originally addressed printer, to remove the job from its automatic print queue and instead convert it into an IP job, because automatic printing of the job is no longer necessary and, in fact, undesirable.

Figure 21:
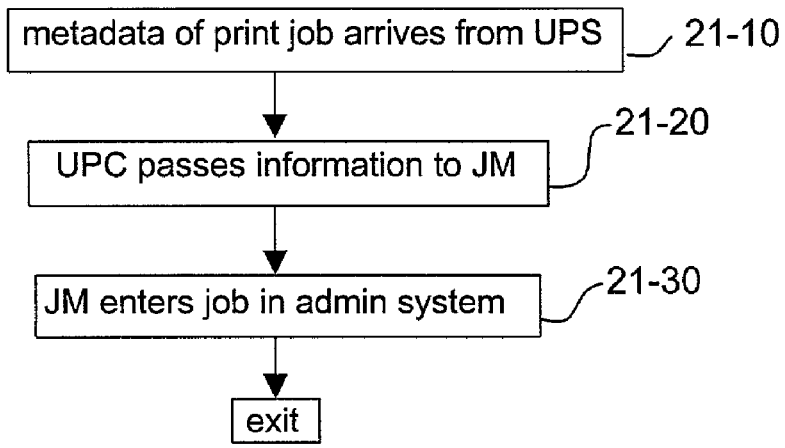
FIG. 21 is a flow diagram of a reception process for metadata of a print file.

FIG. 21 shows the procedure on the arrival, from the UPS, of a metadata file of a new job at a printer 1B, different from the printer (1A) that initially received the print file from a user workstation.

The metadata file is received by UPC 29 (21-10). This recognizes the file and reports the job to the JobManager 12 (21-20), which enters the job as such in its job administration system 12a (21-30), so that it becomes selectable for printing for an operator through the UserInterface 13. Thereafter no further activities take place in respect of this job.

Interactive Printing

Figure 22:
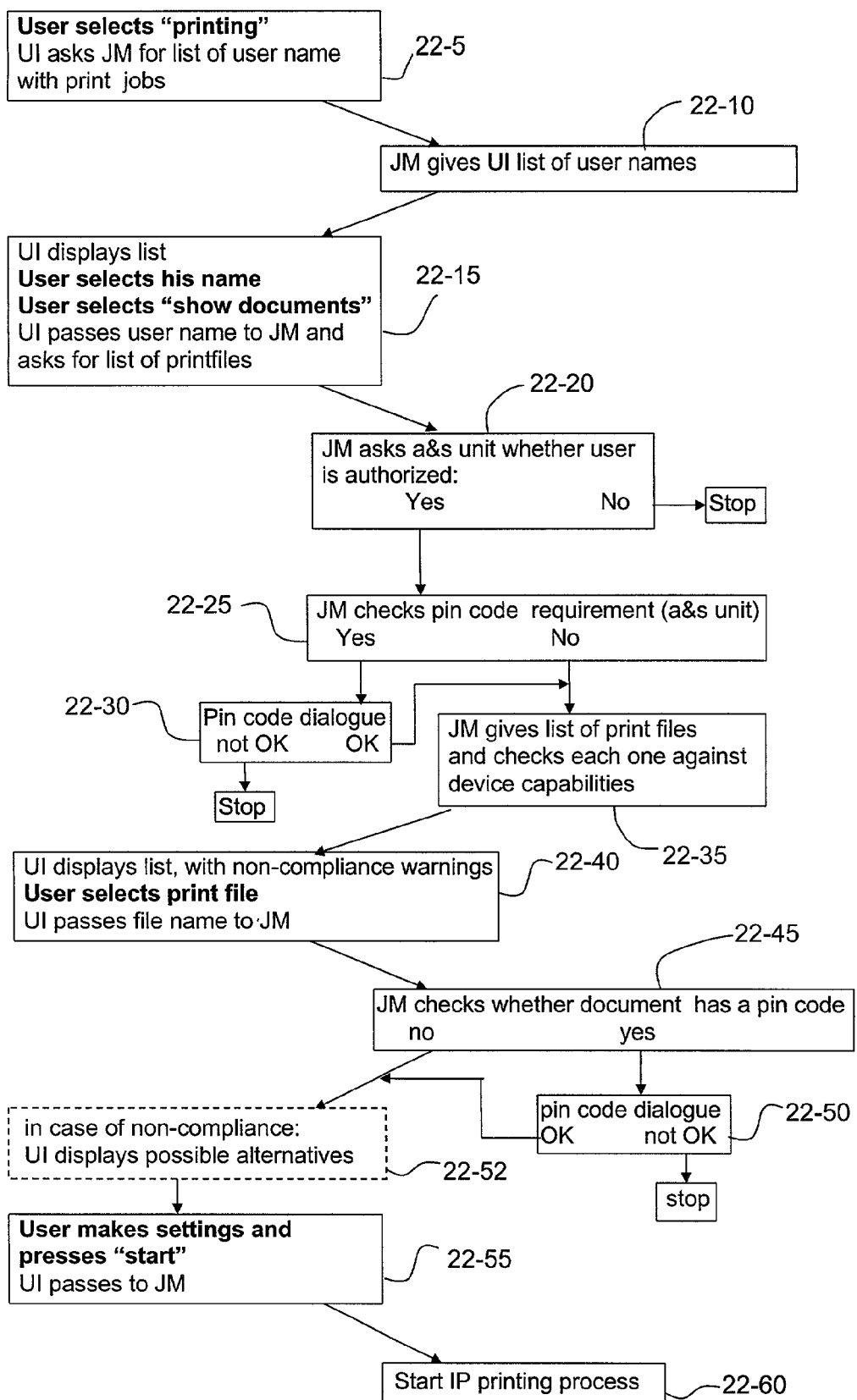
FIG. 22 is a flow diagram of the initial procedure of an interactive printing process according to the advanced embodiment of the invention.

FIG. 22 shows the course of events when a user gives an interactive print order with the aid of the operator control means on the apparatus control panel.

First, the print function is selected (22-5) with key 64A (FIGS. 3/4). The operator control unit 13 then passes a request to the JobManager 12 to pass a list of all the active user names (names of users having at least one print job of the second type in the system). In response to that request, the JobManager makes up a current list and passes it to the operator control unit 13 (22-10). It will be understood that the list includes not only the jobs that are completely stored in the storage unit 20, but also the jobs of which the print data are stored in the storage units of other printers and of which the JobManager 12 only has the metadata plus information in which printer the print data are actually stored.

Figure 22A:
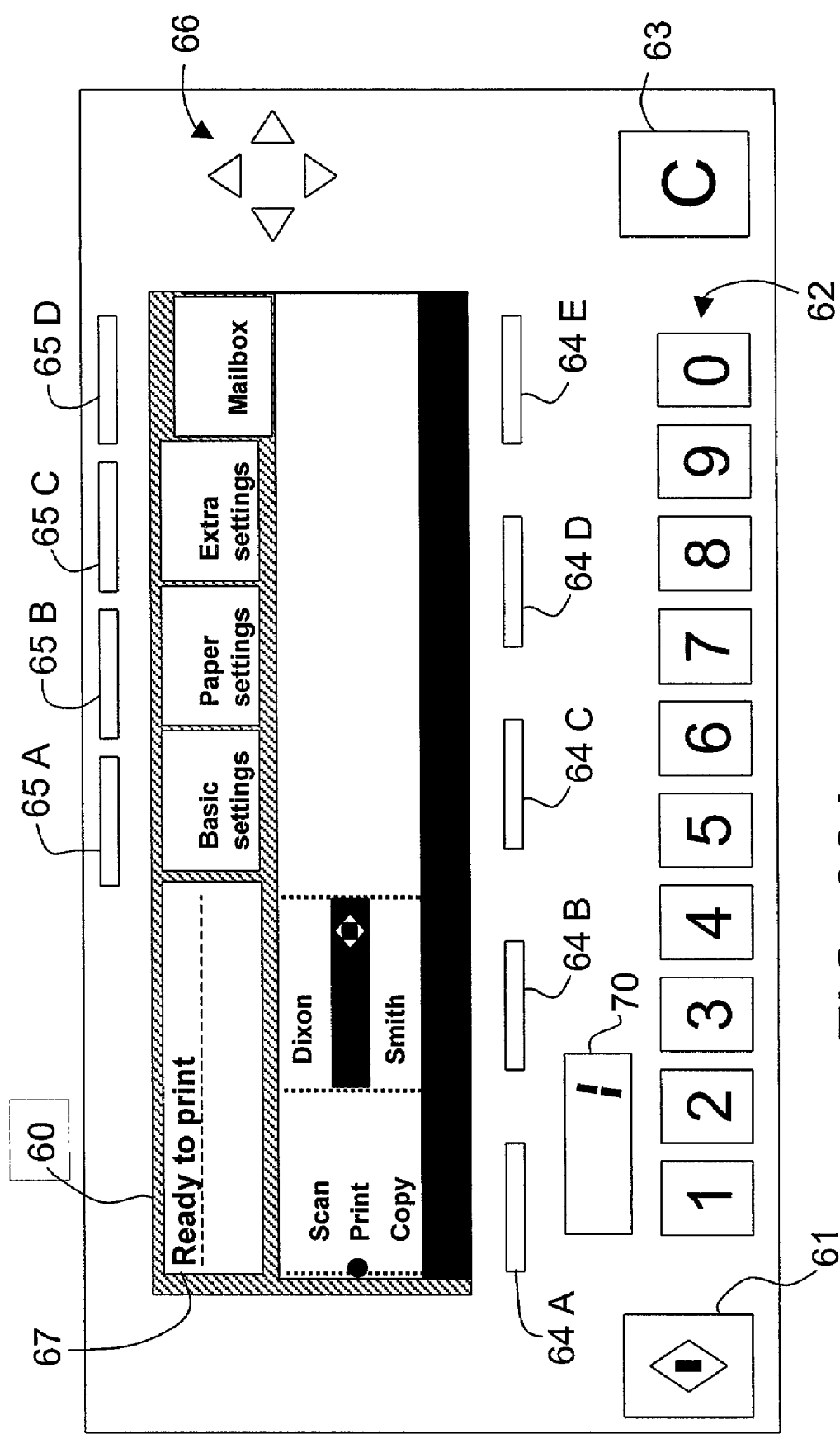
FIGS. 22A–22D illustrate an apparatus operator control panel, according to the advanced embodiment of the invention, in various situations.

The operator control unit displays the user list on the display, in the column above key 64D (FIG. 4), whereafter the user can select his name. The display image is shown in FIG. 22A. If the list is too long to be displayed completely, a part of it is shown on the display and scrolling is possible using the star keys 66. The display focus is on the user who has last submitted a print job to the particular printer (in this example "Evertsen"). After the user has selected his name, he actuates key 64E to obtain an overview of his own print jobs. In response to this, the operator control unit 13 forwards the selected user's name and a request for a list of print jobs of that user to the JobManager (22-15).

Figure 22B:
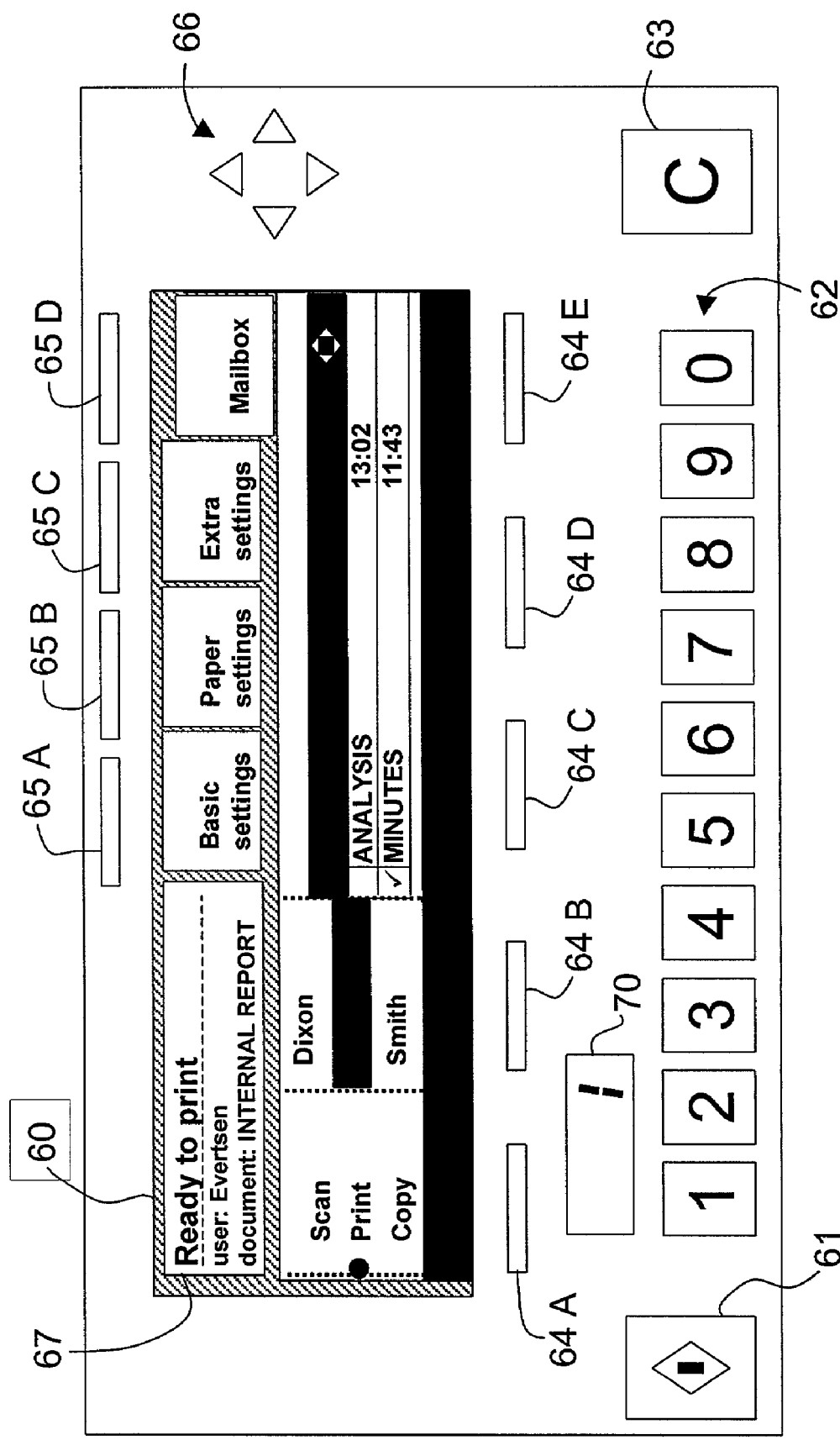

The JobManager now checks with the accounting and security unit 27 if the user is authorized for printing (22-20), and, if so, whether there is a user's code for this user's name (22-25). In the latter case, it conducts a dialogue with the user through the agency of the operator control unit 13 in order to check the user's code (22-30). If the result is positive, the JobManager makes up a current list of interactive and automatic print jobs of the current user and passes it through to the operator control unit 13, which displays this list to the user for selection on display 60 (22-35). The display image is shown in Fig. 22B. The submission time of each job is shown at the side of the file name. A "tick" sign is shown at the left of a file name in the list after the file has been printed. If the list is too long to be displayed completely, a part of it is shown on the display and scrolling is possible using the star keys 66. The display focus, including a preselection, is on the print job submitted last to the particular printer (in this example "INTERNAL REPORT"). In this embodiment, the keys 64 C-E have functions for file management. Key 64C is for selecting all print jobs of the current user, key 64D is for selecting the newly-arrived print jobs only, and key 64E is for deleting any selected jobs.

It is possible that a print job shown in the list is at that moment running at another printer. Since the start of printing of a print job is reported to the other printers via the UPS, the JobManager is aware of the job status and shows this to the user, e.g. in the message window 67 on the display. The user may interfere with the running print process, as will be explained later.

Since the connected printers may differ in functionality, it is possible that a print job cannot be processed at the printer where it has been selected, e.g. a job may have the setting "duplex printing" and the printer may only be capable of simplex printing. The JobManager 12 checks the metadata of every selected job and determines whether printing according to the job settings is possible or not.

The user may now confirm the preselected print file or select another print file (22-40). The name of the selected print file is transmitted by the operator control unit 13 to the JobManager 12. The JobManager then checks whether a security code was sent with the metadata file (22-45). If indeed a security code was sent with the selected file, then through the agency of the operator control unit the JobManager again carries out a dialogue (22-50) with the user to check the code. If the result is positive, the JobManager releases the file for printing.

Figure 22C:
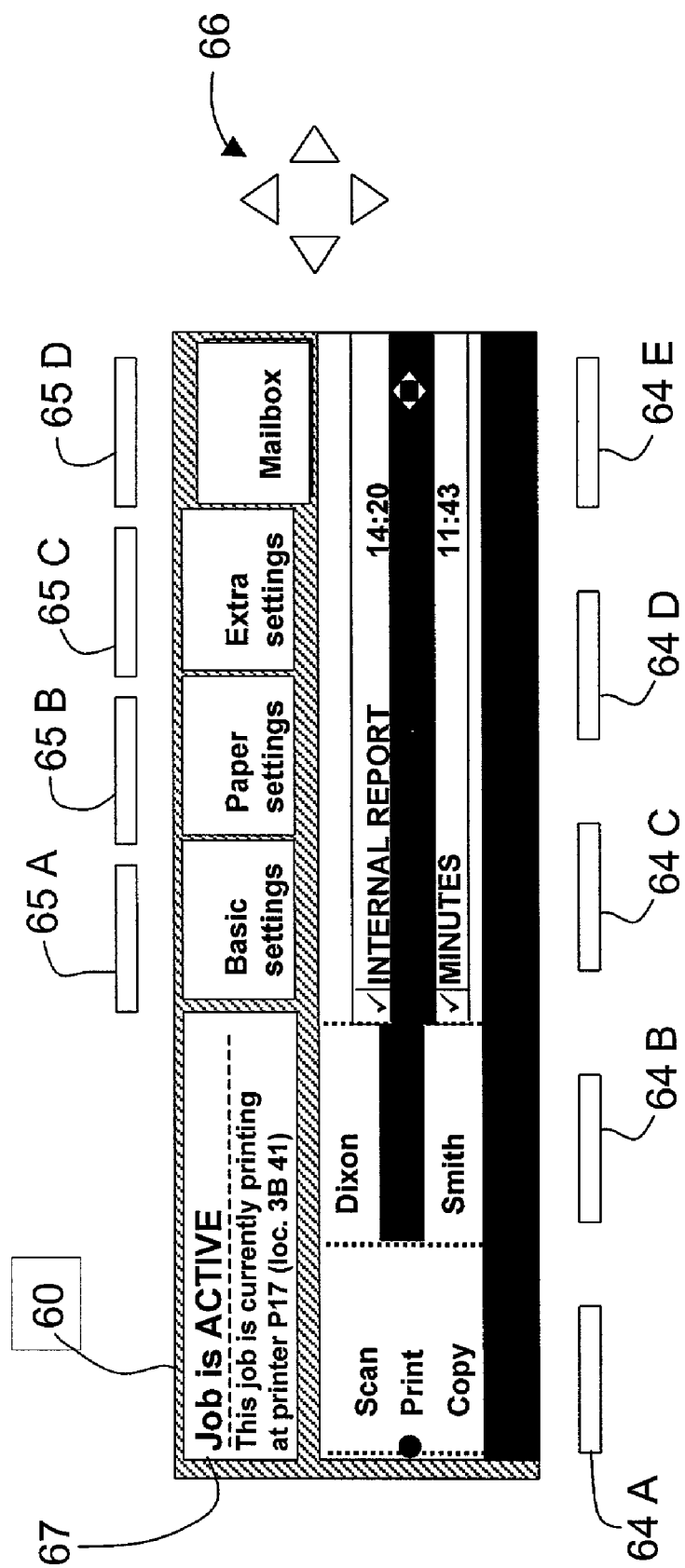

If the job is running on one of the other printers, this is communicated to the user by a warning message in the message window 67 on the display 60, as shown in FIG. 22C. The user now has the opportunity to stop the printing by actuating key 64 C, in which case the print process is aborted but the print file remains to be stored and may afterwards be selected for printing on any of the printers. The user may also start the print process at his printer by actuating the start key 61, while the job continues to be printed at the other printer.

Figure 22D:
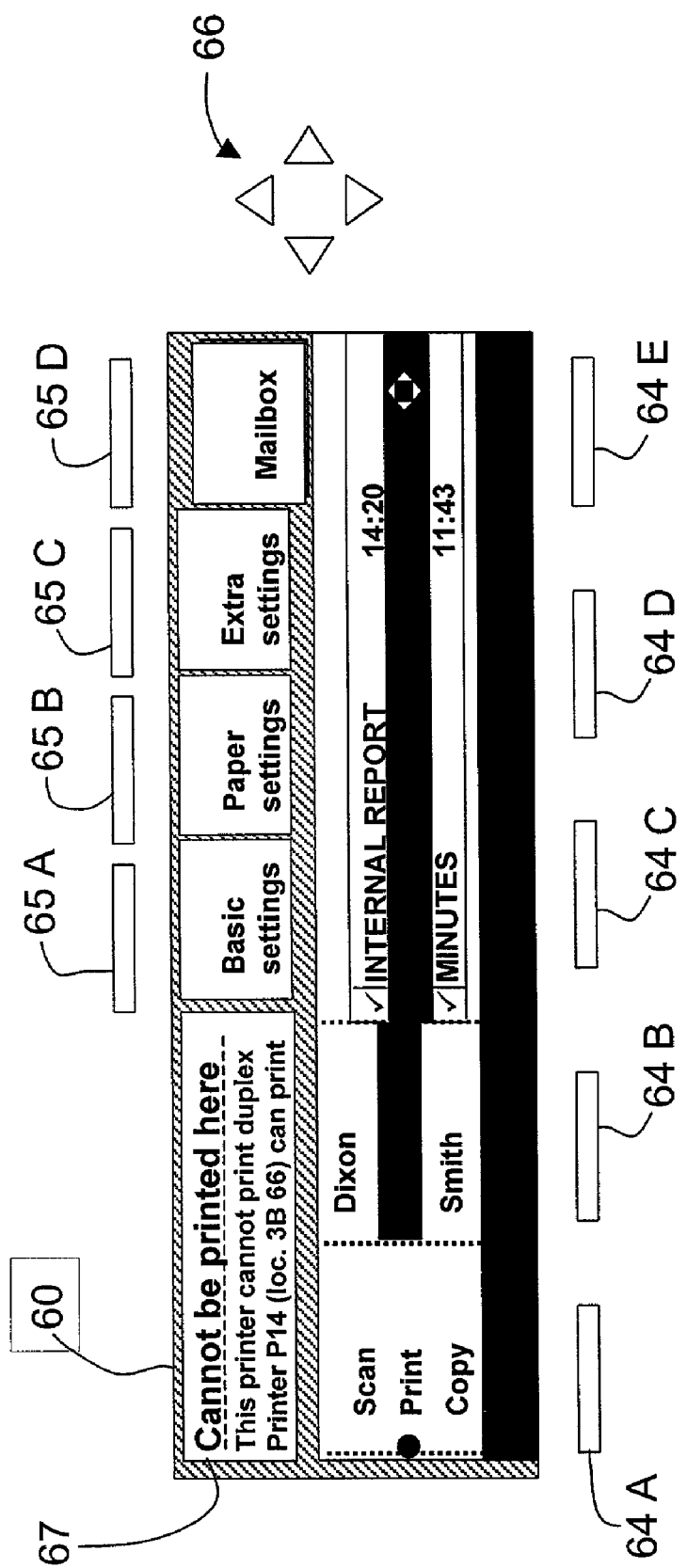

If it was found in step 22-40 that printing according to the job settings is not possible, a warning message is now shown in the message window 67 in the display image 60, saying that printing of the selected print job according to its predefined settings is not possible and why (22-52). The corresponding display image is shown in FIG. 22D.

Also, since the JobManager has information about the capabilities of the other printers, it checks if printing according to the settings is possible at one of the other printers. If this is the case, this will be shown in the warning message. If more than one other printer can do the job, the JobManager uses a list of the locations of the other printers to find the most closely located other printer therefor. Of course, other criteria for selecting an alternative printer may be used as well, such as, for instance, degree of occupation.

The user can check the job settings including the finishing parameters on the operator control panel using the keys 65 A, B and C, and may change them (22-55). In this way, the user may also adapt the settings to the capabilities of the printer in order to make the job printable after all. Finally, the user can start the printing process (22-60) by actuating the start key 61.

If the user has selected more than one print job, all selected jobs are handled and printed successively.

Print profiles, as described herein for a single-printer system, may also be supported in the multi-device system. Print profiles for each respective user are stored in one of the printers or, alternatively, in the UPS. Additionally, print profiles for general use may also be stored. When a user selects his name at the console of a printer, not only his print jobs, but also his print profiles (and possibly the profiles for general use) are displayed in the file list. The user may now select one of the profiles, whereupon the operator control unit 13 takes over the settings in the print profile, showing them in the display 60. Next, the user selects a print job, and the operator control unit 13 passes the selection of the print job and the settings to the JobManager 12, step 22-40.

Printing Process

Figure 23:
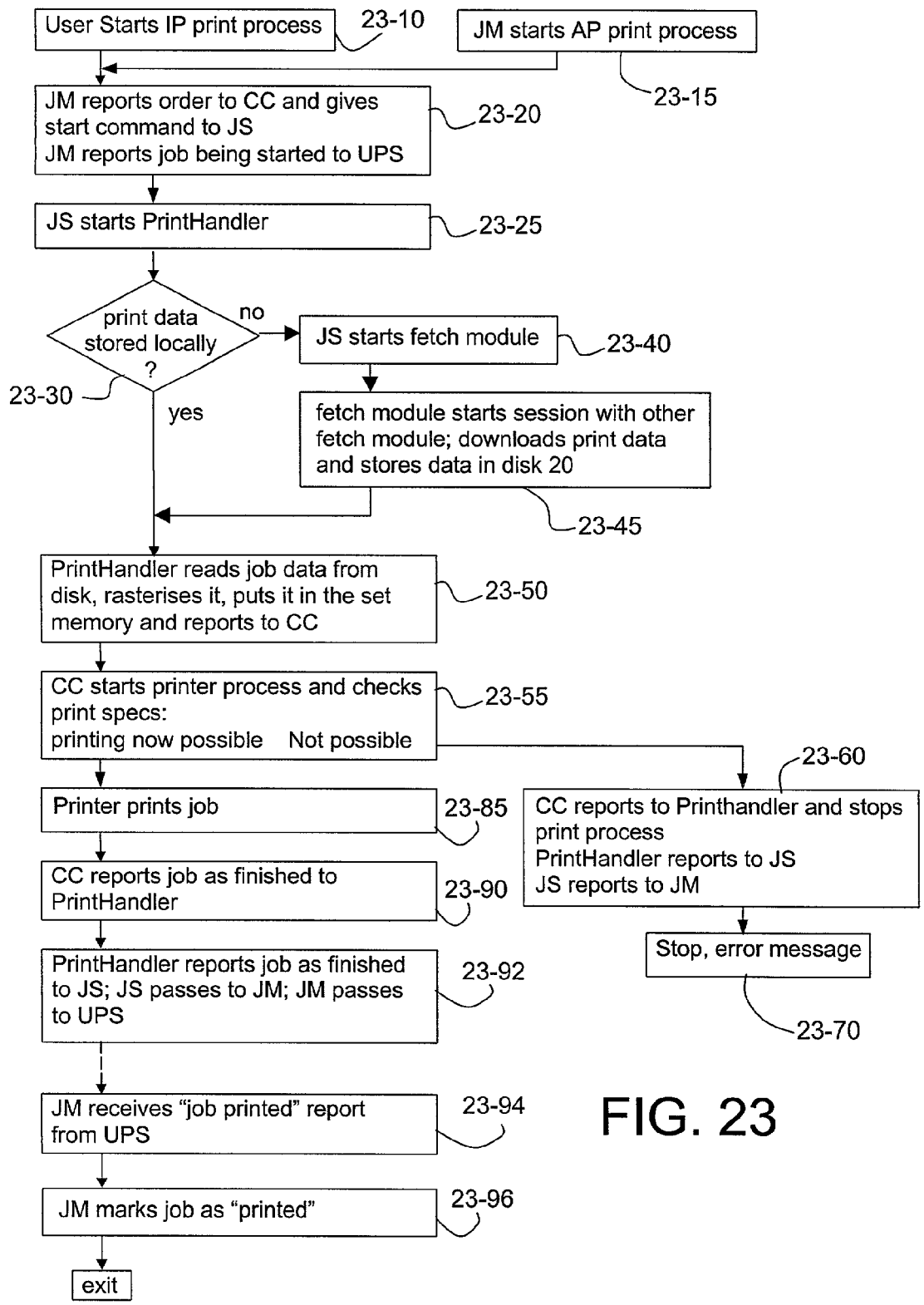
FIG. 23 is a flow diagram of a printing process.

FIG. 23 shows the progress of the printing process started by a user for an interactive print job (IP) (23-10) or started by the JobManager 12 when an automatic print job reaches the top of the AP print queue (23-15). It should be noted here that the JobManager is so programmed as to be able to start an automatic print job only if no activity has been observed on the operator control panel for a predetermined time, e.g. 30 seconds. This prevents a user occupied in a job at the operator control panel from being disturbed by the sudden start of an automatic print job.

The JobManager 12 reports the print job to the CopyController 6 and gives a start command (23-40) for this order to the JobServer. It also reports to the UPS that the job has been started, and the UPS in turn informs the other printers thereof.

The JobServer starts up (23-25) the PrintHandler 25, which reads the relevant print file from the storage unit 20, rasterizes it, and stores it (23-50) in the set memory 4.

The print data of the job may in fact be stored in another printer. In that case (23-30), the JobManager 12 informs the JobServer 21 in which printer the print data are stored. The JobServer then starts up the fetch module 30 (23-40), which fetches the print data file from the relevant printer and stores the file in the storage unit 20 (23-45). The PrintHandler then processes the print data and stores the resulting image data in the set memory 4. The PrintHandler may in fact start processing the print data when enough print data have been fetched and stored, and does not have to wait until the fetch process has been completed.

On a report from the PrintHandler to the CopyController 6 to the effect that sufficient image data are stored in the set memory, the CopyController starts (23-55) the printer unit 5 to make a print.

In this connection (23-55) the CopyController first checks whether the print specifications belonging to the print job have been satisfied, for example if there is a stock of the required type of image supports (format, orientation, color). If these specifications have not been met, then the job is stopped. The CopyController reports (23-60) this to the PrintHandler, which passes the report through to the JobServer, the latter in turn passes (23-65) it to the JobManager, and the latter reports (23-70) the impossibility for printing to be carried out, to the user by a message on the display of the operator control unit 13.

If the print job can be processed, the printer unit 5 reads the image data out of the set memory 4, prints them (23-85), and reports (23-90) this to the CopyController 6. When the complete print job has been carried out, the CopyController reports (23-92) this to the PrintHandler 25, which passes this to the JobServer 21, which in turn passes this to the JobManager 12, and the latter reports the job printed to the UPS. In reaction, the UPS marks the job as "printed" in its job list 34 and informs the printers thereof. These in turn then mark the job as printed (23-94) in their administration systems, thus completing (23-96) the printing process.

Print by Reference Implementation

The printing of a remotely stored print file may also be implemented in the following way. A print file is received at one of the printers (printer A), which extracts the metadata and sends the metadata to the UPS which in turn distributes the metadata to the other printers in the form of an IP job. This particular kind of IP job, however, does not include print data, but only a reference code. The other printers store the reference code in their storage units 20, in the same way as if it were print data. When a user now wants to print the job at another printer (printer B), the PrintHandler of printer B tries to read the print data from the storage unit, finds (and recognizes) the reference and has the actual print data fetched from the storage location specified in the reference code. The reference code may also refer to a storage location in the UPS in which the actual storage location of the data (an address in one of the other printers) is stored.

Solution for Non-dedicated Printers

The above-described embodiment makes use of dedicated printers, i.e. printers that have been suitably programmed and are provided with the necessary operating means. However, it is possible to include other printers, e.g. normal network printers, into the system by connecting them to the network via a dedicated server device. Two implementations of such devices are described below.

Figure 24:
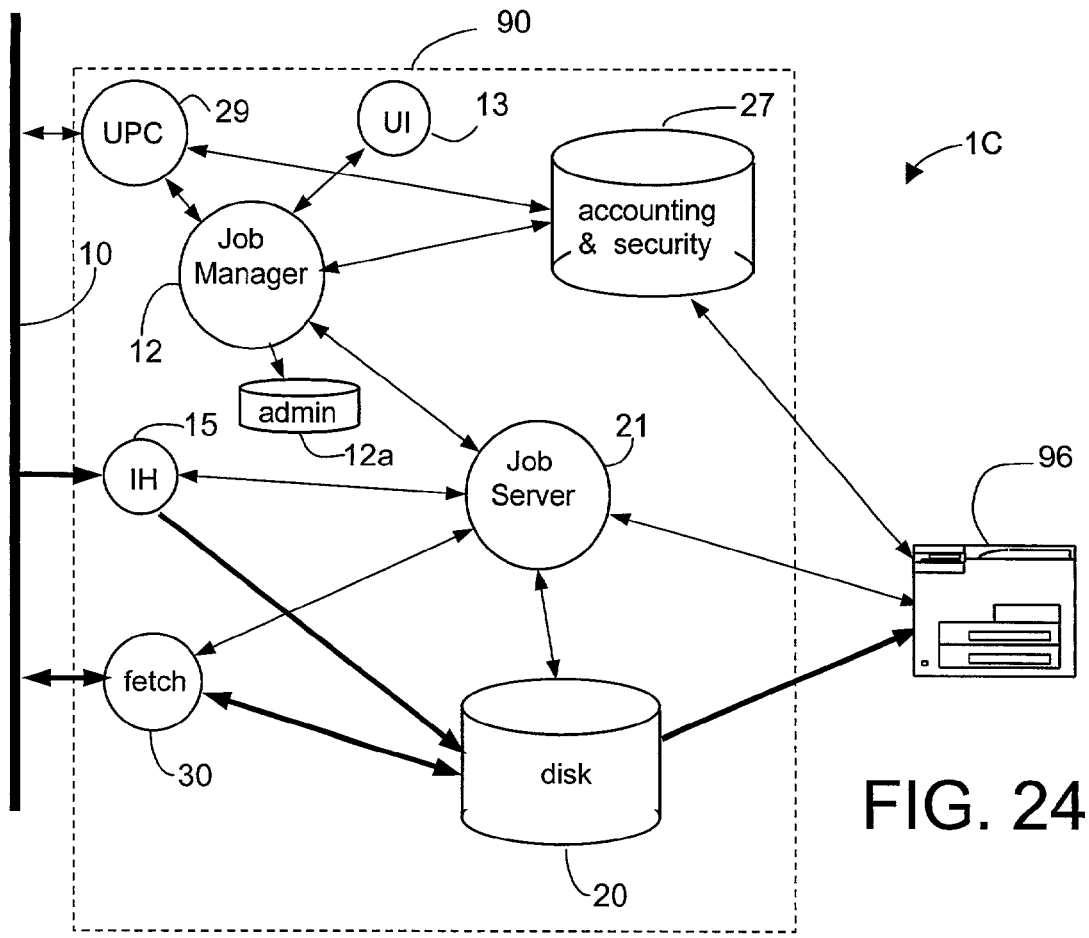
FIGS. 24 and 25 are schematic diagrams of server/printer combinations for use in the system of the advanced embodiment of the invention.

FIG. 24 shows the constituent parts of a server/printer-combination as denominated IC in FIG. 17. The server 90 includes all basic functions of the dedicated printer device 1A, 1B as described with reference to FIG. 18, with the exception of the PrintHandler 25, which is incorporated in the printer 96 (further, all parts related to scanning are not present). The interrelation and cooperation of the shown parts in the server 90 are closely similar to those of the dedicated printer device 1A, so that a further explanation of the printing processes is considered superfluous.

Figure 25:
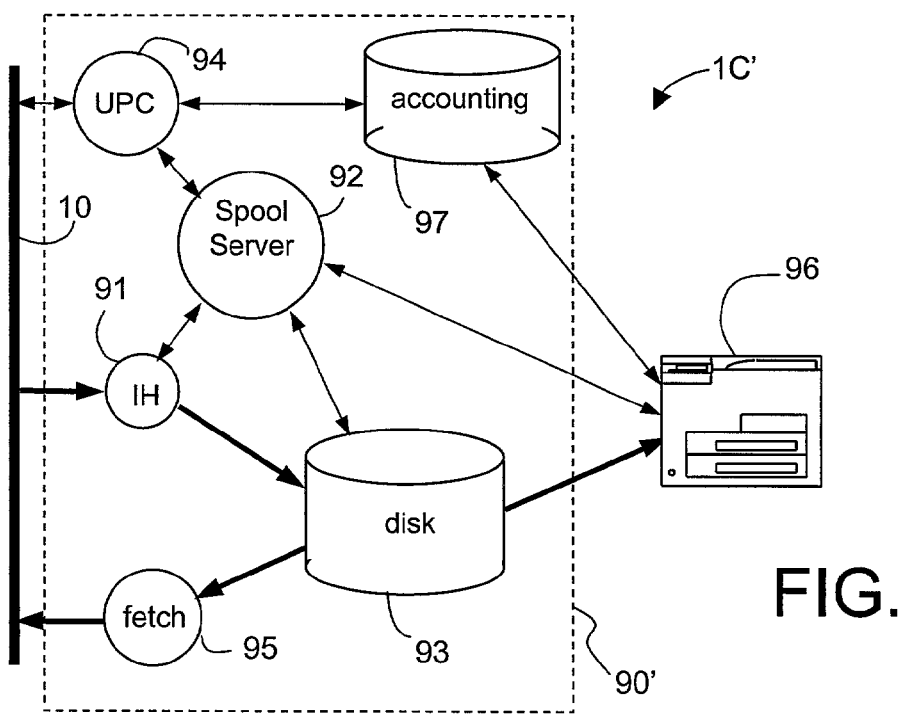

FIG. 25 shows a server/printer-combination for connection to an unchained-printing system, as a printer 1C' having a limited functionality. The server 90' of this combination includes a spool function which is accessible for the UPS and the other printers, but does not include means for printing print files stored in another printer. This configuration is particularly suitable for extending the unchained-printing advantages to normal printers connected to the same network, without interfering with the normal operation of such printers. Thus, such printers can continue to operate in a normal way, but print jobs submitted to them become available for printing with dedicated unchained-printing printers at other locations.

The server 90' includes an InputHandler 91 connected to the network 10 for receiving print files from user workstations, a storage unit (hard disk) 93 and a SpoolServer 92 for managing the print process and the storage unit 93. Further, the SpoolServer 92 is connected to an Unchained-Printing Client (UPC) 94, which keeps contact with the UPS via the network 10. The storage unit 93 is connected to the external printer 96 for delivering print data thereto. Also, the storage unit 93 is connected to a fetch module 95 which is connected to the network 10 for uploading files from the storage unit 93 to other printers upon request. An accounting database 97 is connected to the external printer 96 for accounting of produced prints, and to the UPC 94 for exchanging accounting information with the UPS.

Figure 26:
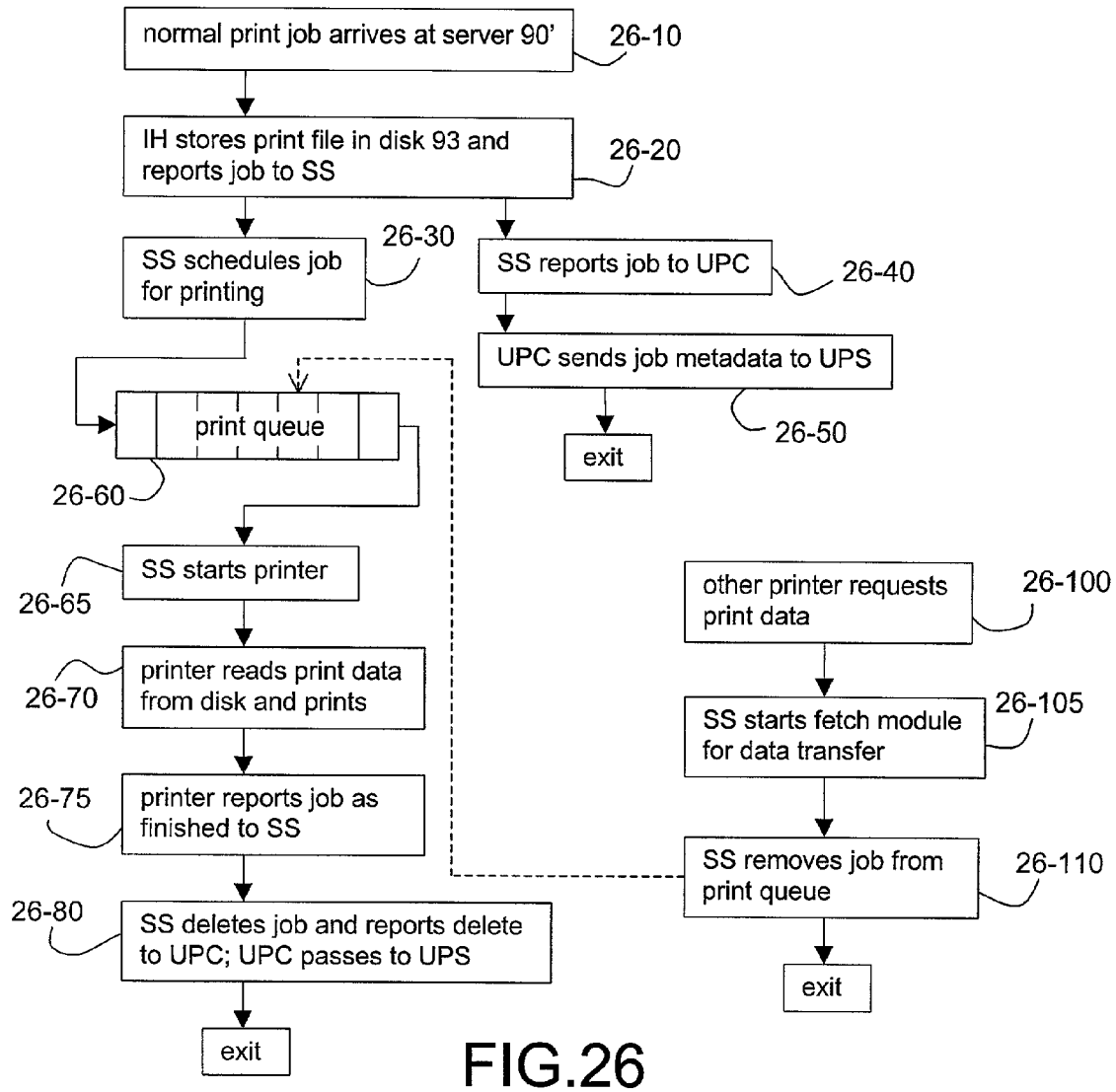
FIG. 26 is a flow chart showing the operation of the server/printer combination of FIG. 25.

The operation of the server/printer combination of FIG. 25 is shown in FIG. 26.

Upon reception of a new print job (26-10), the InputHandler 91 stores the print file in the storage unit 93 (26-20) and reports the job to the SpoolServer 92. The SpoolServer 92 extracts metadata from the print file and sends the metadata via the UPC 94 (26-40) to the UPS (26-50), which distributes the information to the other printers, that in turn make the corresponding print files selectable for local printing.

The SpoolServer enters the new job in a print queue for the printer 96 (26-30/60). Each time the printer 96 finishes a print job, the SpoolServer sends a copy of the print data of the job at the top of the queue to the printer 96 (26-65), which processes the job (26-70). As long as a print file is still in the queue, another printer can request upload of the corresponding print data through the fetch module 95, but when a particular job has been printed completely (26-75), the print data are deleted and a "delete" message is sent to the UPS (26-80), which in turn orders the other printers to delete the job from their selection lists. If another printer requests the print data of a print job that is still in the queue (26-100), the SpoolServer 92 starts up the fetch module 95 (26-105), that transfers the data to the requesting printer, and then the SpoolServer removes the print job from the print queue (26-110), because obviously this job will no longer be expected to be printed at the original destination printer.

The concept of unchained printing may also be applied to scanning. In that case, a scan session is performed locally in one of the connected digital copier devices, and the scan data file is reported to a central server function, e.g. implemented in the UPS, but stored locally in the storage unit of the device, where it waits to be fetched from a workstation. It is also possible to print the scan data file at any of the connected printers via the scheme described above.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A method of printing digital print files in a network system including a digital network, at least one personal workstation of a user and a plurality of printers, at least a subset of the printers having a local memory and an operator control unit provided with inputting means and a display, said network system further including a print service and a print file storage service, and a digital print file including metadata specifying job information and print image data, the method comprising the steps of:
   submitting print files from a workstation of a user to said print service;
   receiving said print files at the print service;
   extracting, by the print service, at least part of the metadata of a received print file and storing the same in a storage dedicated to the print service as well as storing the print image data of a received print file in a logical storage space allocated to said user in the print file storage service; and
   automatically transmitting, by the print service, extracted metadata of each received print file to at least two printers of the subset of the printers, without the print service receiving a request for such transmission,
   wherein by each of the printers of the subset, the method further comprises the steps of:
      presenting all print files of a respective user that are in the system in the form of one complete list on the display of the operation control unit of the printer, wherein metadata of said all print files is locally available in the printer,
      permitting an operator to select a print file from the list and to give a command for locally printing the selected print file, and
      in reaction to a selection by the operator, fetching the print data of the selected print file from the print file storage service and transferring the fetched print data to a printer unit of the printer.

2. The method of claim 1, further comprising the step of:
   communicating status changes of a print file to all printers which have the associated metadata.

3. The method of claim 2, wherein a status change of a print file is reported, by a printer in which said status change takes place, to the print service, and
   wherein the print service communicates the reported status change to the printers which have the associated metadata.

4. The method of claim 2, further including the step of:
   updating the local print selection mechanisms of the printers in accordance with reported status changes of print files.

5. The method of claim 2, wherein the status changes include starting a print process, finishing a print process, and deleting the print file.

6. The method of claim 1, further including the step of:
   maintaining, by the print service, a list of all print files in the system, including the metadata of said files.

7. The method of claim 1, further including the step of:
   locally storing in each printer, information on capabilities and status of connected printers.

8. The method of claim 7, further including the step of:
   automatically advising the operator of at least one printer that has the capabilities needed for printing said print file, if such a printer is available when the operator selects a print file for printing at a specific printer, and when said specific printer does not have the capabilities needed for printing said print file.

9. The method of claim 8, wherein said advice is given as a message on the display of said specific printer.

10. The method of claim 7, wherein,
    automatically advising the operator of at least one printer that can print said print file, if such a printer is available when the operator selects a print file for printing at a specific printer, and when said specific printer cannot print said print file.

11. The method of claim 10, wherein said advice is given as a message on the display of said specific printer.

12. The method of claim 1, further comprising the step of:
    checking, upon receipt from the workstation of a print file, whether a logic storage space for the user already exists in the storage service, and if that is not the case, automatically adding a logical storage space for the user.

13. The method of claim 1, wherein the logical storage space has the form of a directory in a memory.

14. The method of claim 1, wherein the logical storage space has the form of an entry in a database.

15. The method of claim 1, wherein in the automatically transmitting step, the print service transmits the extracted metadata of each received print file to the at least two printers of the subset of the printers, at the same time.

16. A method of printing digital print files in a network system including a digital network, at least one personal workstation of a user and a plurality of printers, at least a subset of the printers having a local memory and an operator control unit provided with inputting means and a display, said network system further including a print server, a digital print file including metadata specifying job information and print image data, the method comprising the steps of:
    submitting a print file from a workstation of a user to a printer;
    receiving said print file at the printer;

extracting, by the printer, at least part of the metadata of said print file and storing the same in its local memory as well as storing the print image data of said print file in a logical storage space allocated to said user in its local memory;

automatically transmitting, by the printer, extracted metadata to the print server;

receiving said extracted metadata at said print server;

automatically transmitting, by the print server, the received metadata to at least one other printer, without the print server receiving a request for such transmission;

receiving said metadata by said at least one other printer and including said metadata in a local print selection mechanism resident in said other printer;

presenting, on the display of the operator control unit of said other printer, all print files of a user that are in the system in the form of one complete list, wherein metadata of said all print files is locally available in that printer;

permitting an operator to select a print file from the list and to give a command for locally printing the selected print file; and fetching the print data of the selected print file from the local memory of the first-mentioned printer and transferring the fetched print data to said other printer.

17. The method of claim 16, further comprising the step of:
communicating status changes of a print file to said print server and, via said print server, to all printers which have the associated metadata.

18. The method of claim 17, wherein a status change of a print file is reported, by a printer in which said status change takes place, to the print server, and
wherein the print server communicates the reported status change to the printers which have the associated metadata.

19. The method of claim 17, further including the step of:
updating selection lists of the printers in accordance with reported status changes of print files.

20. The method of claim 17, wherein the status changes include starting a print process, finishing a print process, and deleting the print file.

21. The method of claim 16, further including the step of:
maintaining, by the print server, a list of all print files in the system, including the metadata of said files.

22. The method of claim 16, further including the step of:
locally storing information on capabilities and status of connected printers in each printer.

23. The method of claim 22, further including the step of:
automatically advising the operator of at least one printer that has the capabilities needed for printing said print file, if such a printer is available when the operator selects a print file for printing at a specific printer, and when said specific printer does not have the capabilities needed for printing said print file.

24. The method of claim 23, wherein said advice is given as a message on the display of said specific printer.

25. The method of claim 22, wherein, automatically advising the operator of at least one printer that can print said print file, if such a printer is available when the operator selects a print file for printing at a specific printer, and when said specific printer cannot print said print file.

26. The method of claim 25, wherein said advice is given as a message on the display of said specific printer.

27. The method of claim 16, further comprising the step of:
checking, upon receipt from the workstation of a print file, whether a logic storage space for the user already exists in the storage service, and if that is not the case, automatically adding a logical storage space for the user.

28. The method of claim 16, wherein the logical storage space has the form of a directory in a memory.

29. The method of claim 16, wherein the logical storage space has the form of an entry in a database.

30. The method of claim 16, wherein each connected printer is provided with a server process that is logically connected to the server processes in the other printers, and wherein the server processes together form a distributed print server.

31. A network printing system for printing digital print files, said system comprising:
a digital network;
at least one personal workstation of a user;
a plurality of printer devices, at least a subset of the printer devices having a local memory, an operator control unit provided with inputting means and a display, and a printer unit; and
a print service and a print file storage service, in which a digital print file includes metadata specifying job information, and print image data,
said print service including:
a receiving module for receiving print files submitted from a workstation of a user,
an extracting module for extracting at least part of the metadata of a received print file and storing the same in a storage dedicated to the print service,
a storing module for storing the print image data of a received print file in a logical storage space allocated to said user in the print file storage service, and
a transmitting module for automatically transmitting extracted metadata of each received print file to at least two printer devices of said subset of printer devices, without the print service receiving a request for such transmission, each of the printer devices of said subset further including:
a network connection unit, operable for receiving from the print service metadata of a print file and storing the same in a local memory, and
a management unit connected to the network connection unit for including each print file of which metadata is stored in the local memory, in a local print file selection mechanism it manages in the printer device,
a presentation module for presenting all print files of a respective user that are in the system in the form of one complete list on the display of the operation control unit of the printer device, wherein metadata of said all print files is locally available in the printer device,
a selection module for permitting an operator to select a print file from the list and to give a command for locally printing the selected print file, and
a fetch module for, in reaction to a selection by the operator, fetching the print data of the selected print file from the print file storage service and transferring the fetched print data to the printer unit.

32. The system of claim 31, wherein said management unit further is operable to report status changes of a print file to all printers which have the associated metadata.

33. The system of claim 31, wherein said management unit is operable to report status changes of a print file to the print service, and wherein the print service is operable to automatically report a reported status change to the printers which have the associated metadata.

34. The system of claim 32, wherein said management unit is operable to update its local print selection mechanism in accordance with received print file status change reports.

35. The system of claim 32, wherein the status changes include starting a print process, finishing a print process, and deleting the print file.

36. The system of claim 31, wherein the print service maintains a list of all print files in the system, including the metadata of said files.

37. The system of claim 31, wherein the management unit of each printer device maintains a list including information on capabilities and status of connected printer devices.

38. The system of claim 37, wherein the management unit of a certain printer device is operable to advise, by reference to said list of information on capabilities of other printer devices, the operator of at least one printer device that has the capabilities needed for printing said print file, if such a printer device is available when the operator selects a print file for printing at said certain printer device, and when said certain printer device does not have the capabilities needed for printing said print file.

39. The system of claim 38, wherein said advice is given as a message on the display of that said certain printer device.

40. The system of claim 37, wherein the management unit of a certain printer device is operable to advise the operator of at least one printer device that can print said print file, if such a printer device is available when the operator selects a print file for printing at said certain printer device, and when said certain printer device cannot print said print file.

41. The system of claim 40, wherein said advice is given as a message on the display of said certain printer.

42. The system of claim 31, wherein the print service is operable to check, upon receipt from the workstation of a print file, whether a logic storage space for the user already exists in the storage service, and if that is not the case, to add a logical storage space for the user.

43. The system of claim 31, wherein the logic storage space has the form of a directory in a memory.

44. The system of claim 31, wherein the logic storage space has the form of an entry in a database.

45. The system of claim 31, wherein the transmitting module transmits the extracted metadata of each received print file to the at least two printer devices of said subset of printer devices, at the same time.

46. A printer device for printing digital print files, for use in a network printing system, said system including a digital network, at least one personal workstation of a user and a plurality of printer devices, in which a digital print file includes metadata specifying job information and print image data, said printer device comprising:
  a network connection unit, for communicating via the network with the system;
  a local memory;
  a printer unit;
  an operator control unit provided with inputting means and a display; and
  a management unit connected to the network connection unit, said management unit including:
    a receiving module for receiving print files submitted from a workstation of a user,
    an extracting module for extracting at least part of the metadata of a received print file and storing the same in a local storage dedicated to the management unit,
    a storing module for storing the print image data of a received print file in a logical storage space allocated to said user in the local memory,
    a transmitting module for automatically transmitting extracted metadata directly or indirectly to at least one other printer device, without said printer device receiving a request for such transmission,
    a presentation module for presenting all print files of a respective user that are in the system in the form of one complete list on the display of the operation control unit of the printer device, wherein metadata of said all print files is locally available in the printer device,
    a selection module for permitting an operator to select a print file from the list and to give a command for locally printing the selected print file, and
    a fetch module for, in reaction to a selection by the operator, fetching the print data of the selected print file from the local memory of the printer device that received said print data and transferring the fetched print data to a printer unit of the printer device.

47. The printer device of claim 46, wherein said management unit further is operable to report status changes of a print file directly or indirectly to all printers which have the associated metadata.

48. The printer device of claim 47, wherein said management unit is operable to update its local print selection mechanism in accordance with received print file status change reports.

49. The printer device of claim 47, wherein the status changes include starting a print process, finishing a print process, and deleting the print file.

50. The printer device of claim 46, wherein the management unit of each printer device maintains a list including information on capabilities and status of connected printer devices.

51. The printer device of claim 52, wherein the management unit of a certain printer device is operable to advise, by reference to said list of information on capabilities of other printer devices, the operator of at least one printer device that has the capabilities needed for printing said print file, if such a printer device is available when the operator selects a print file for printing at said certain printer device, and when said certain printer device does not have the capabilities needed for printing said print file.

52. The printer device of claim 51, wherein said advice is given as a message on the display of said certain printer device.

53. The printer device of claim 50, wherein the management unit of a certain printer device is operable to advise the operator of at least one printer device that can print said print file, if such a printer device is available when the operator selects a print file for printing at said certain printer device, and when said certain printer device cannot print said print file.

54. The printer device of claim 53, wherein said advice is given as a message on the display of said certain printer.

55. The printer device of claim 46, wherein the management unit is operable to check, upon receipt from the workstation of a print file, whether a logic storage space for the user already exists in the local memory, and if that is not the case, to add a logical storage space for the user.

56. The printer device of claim 46, wherein the logic storage space has the form of a directory in a memory.

57. The printer device of claim 46, wherein the logic storage space has the form of an entry in a database.

58. A method of printing digital print files in a network system, the network system including a server, a plurality of user devices corresponding respectively to a plurality of different users, and a plurality of printers, wherein the server communicates with the plurality of user devices and the plurality of printers via a network, the method comprising:

receiving, by the server, a plurality of print files of the plurality of different users from the plurality of user devices, each of the print files including metadata specifying job information and print image data;

extracting, by the server, the metadata from each of the received print files;

storing the print image data of each of the received print files at the server's side;

automatically transmitting, by the server, the extracted metadata of all the received print files from the plurality of different users, to the plurality of printers at the same time via the network;

presenting, by any one of the plurality of printers, a list of all print files of all the plurality of different users based on the metadata received by the any one of the plurality of printers;

receiving an operator's selection of a print file from the list; and in response to the operator's selection, fetching, by the any one of the plurality of printers, the print image data of the selected print file from the server's side via the network, so as to print the fetched print image data.

59. The method of claim 58, wherein in the automatically transmitting step, the extracted metadata of all the received print files from the plurality of different users are transmitted from the server to the plurality of printers, without the server receiving a request for such transmission from any of the plurality of printers or from other external source.

\* \* \* \* \*